(12) United States Patent
Yin et al.

(10) Patent No.: US 12,553,773 B2
(45) Date of Patent: Feb. 17, 2026

(54) LIGHT DETECTION STRUCTURE AND METHOD THEREOF, DISPLAY SUBSTRATE AND DISPLAY DEVICE

(71) Applicant: BOE Technology Group Co., Ltd., Beijing (CN)

(72) Inventors: Xinshe Yin, Beijing (CN); Hui Zhao, Beijing (CN); Xinbin Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 228 days.

(21) Appl. No.: 18/275,017

(22) PCT Filed: Jul. 28, 2022

(86) PCT No.: PCT/CN2022/108655
§ 371 (c)(1),
(2) Date: Jul. 31, 2023

(87) PCT Pub. No.: WO2024/020940
PCT Pub. Date: Feb. 1, 2024

(65) Prior Publication Data
US 2025/0052617 A1  Feb. 13, 2025

(51) Int. Cl.
*G01J 3/50* (2006.01)
(52) U.S. Cl.
CPC ..................... *G01J 3/50* (2013.01)
(58) Field of Classification Search
CPC ............. G01J 3/50; G09G 3/20; G09G 5/10
See application file for complete search history.

(56) References Cited

U.S. PATENT DOCUMENTS

2005/0237401 A1* 10/2005 Tan ............. G01J 3/2803
348/255
2008/0158548 A1  7/2008 Chen et al.
2010/0096997 A1  4/2010 Ahn et al.
(Continued)

FOREIGN PATENT DOCUMENTS

CN  107393457 A  11/2017
CN  108168695 A  6/2018
(Continued)

*Primary Examiner* — Thanh Luu
*Assistant Examiner* — Mai Thi Ngoc Tran
(74) *Attorney, Agent, or Firm* — Ling Wu; Stephen Yang; Ling and Yang Intellectual Property

(57) ABSTRACT

A light detection structure may include a photoelectric conversion device, a current conversion device and a control device; the photoelectric conversion device is electrically connected with the current conversion device, configured to convert an incident light of N colors into current signals, and providing the current signals to the current conversion device under a control of a control signal; the current conversion device is configured to convert the current signals into voltage signals corresponding to the current signals; the control device is electrically connected with the photoelectric conversion device and the current conversion device respectively, and is configured to generate the control signals and generate chromaticity parameters of light according to the voltage signals corresponding to the current signals, wherein the chromaticity parameters include brightness, color temperature and color coordinates.

18 Claims, 10 Drawing Sheets

(56) References Cited

U.S. PATENT DOCUMENTS

| | | | |
|---|---|---|---|
| 2013/0313413 A1 | 11/2013 | Kato | |
| 2014/0118232 A1 | 5/2014 | Kim | |
| 2014/0160440 A1 | 6/2014 | Gyoten | |
| 2017/0294173 A1* | 10/2017 | Sun | ........................ G06F 3/0304 |
| 2017/0328767 A1* | 11/2017 | Zheng | ........................ G01J 1/44 |
| 2020/0159385 A1 | 5/2020 | Chung et al. | |
| 2021/0335238 A1 | 10/2021 | Song et al. | |
| 2021/0405410 A1 | 12/2021 | Wang et al. | |

FOREIGN PATENT DOCUMENTS

| | | | |
|---|---|---|---|
| CN | 108735769 A | 11/2018 | |
| CN | 108877653 A | 11/2018 | |
| CN | 109951922 A | 6/2019 | |
| CN | 110940416 A | 3/2020 | |
| CN | 111198630 A | 5/2020 | |
| CN | 111624799 A | 9/2020 | |
| CN | 112985588 A | 6/2021 | |
| CN | 114420067 A | 4/2022 | |
| JP | 2011106875 A | 6/2011 | |

* cited by examiner

LIGHT DETECTION STRUCTURE AND METHOD THEREOF, DISPLAY SUBSTRATE AND DISPLAY DEVICE

CROSS-REFERENCE TO RELATED APPLICATION

This application is a national stage application of PCT Application No. PCT/CN2022/108655, which is filed on Jul. 28, 2022, and entitled "Light Detection Structure and Method Thereof, Display Substrate and Display Device", the content of which should be regarded as being incorporated herein by reference.

TECHNICAL FIELD

The present disclosure relates to, but is not limited to, the field of light detection technologies, and particularly relates to a light detection structure and a method thereof, a display substrate and a display device.

BACKGROUND

With a wide use of artificial intelligence technology, artificial intelligence technology is applied to a mobile display product, which realizes that the mobile display product can customize customers' applications in a specific environment according to users' application environments, so as to increase users' experience in different environments.

SUMMARY

The following is a summary of subject matters described in the present disclosure in detail. The summary is not intended to limit the protection scope of claims.

In a first aspect, the present disclosure provides a light detection structure including: a photoelectric conversion device, a current conversion device, and a control device.

The photoelectric conversion device is electrically connected with the current conversion device, and is configured to convert an incident light of N colors into current signals and provide the current signals to the current conversion device under a control of a control signal, wherein N is a positive integer greater than or equal to 1.

The current conversion device is configured to convert the current signals into voltage signals corresponding to the current signals. The control device is electrically connected with the photoelectric conversion device and the current conversion device separately, and is configured to generate control signals and generate chromaticity parameters of light according to the voltage signals corresponding to the current signals, wherein the chromaticity parameters include brightness, color temperature and color coordinates.

In some possible implementations, when N=4, the photoelectric conversion device includes: four photoelectric conversion elements; the four photoelectric conversion elements include a first photoelectric conversion element, a second photoelectric conversion element, a third photoelectric conversion element and a fourth photoelectric conversion element, and the current signals include a first current signal, a second current signal, a third current signal and a fourth current signal.

The first photoelectric conversion element is electrically connected with a sense signal terminal and a first node respectively, and is configured to convert the incident light of a first color into a first current signal and write the first current signal into the first node.

The second photoelectric conversion element is electrically connected with the sense signal terminal and a second node respectively, and is configured to convert the incident light of a second color into a second current signal and write the second current signal into the second node.

The third photoelectric conversion element is electrically connected with the sense signal terminal and a third node respectively, and is configured to convert the incident light of a third color into a third current signal and write the third current signal into the third node.

The fourth photoelectric conversion element is electrically connected with the sense signal terminal and a fourth node respectively, and is configured to convert the incident light of a fourth color into a fourth current signal and write the fourth current signal into the fourth node.

The first color, the second color, the third color and the fourth color are one of red, green, blue and white, and the first color, the second color, the third color and the fourth color are different colors, and a voltage value of a signal at the sense signal terminal is constant.

In some possible implementations, the first photoelectric conversion element includes a first photoelectric sensor, the second photoelectric conversion element includes a second photoelectric sensor, the third photoelectric conversion element includes a third photoelectric sensor, and the fourth photoelectric conversion element includes a fourth photoelectric sensor.

An anode of the first photoelectric sensor is electrically connected with the first node, a cathode of the first photoelectric sensor is electrically connected with the sense signal terminal, an anode of the second photoelectric sensor is electrically connected with the second node, a cathode of the second photoelectric sensor is electrically connected with the sense signal terminal, an anode of the third photoelectric sensor is electrically connected with the third node, a cathode of the third photoelectric sensor is electrically connected with the sense signal terminal, an anode of the fourth photoelectric sensor is electrically connected with the fourth node, and a cathode of the fourth photoelectric sensor is electrically connected with the sense signal terminal.

Optionally, the cathode of the first photoelectric sensor is electrically connected with the first node, the anode of the first photoelectric sensor is electrically connected with the sense signal terminal, the cathode of the second photoelectric sensor is electrically connected with the second node, the anode of the second photoelectric sensor is electrically connected with the sense signal terminal, the cathode of the third photoelectric sensor is electrically connected with the third node, the anode of the third photoelectric sensor is electrically connected with the sense signal terminal, the cathode of the fourth photoelectric sensor is electrically connected with the fourth node, and the anode of the fourth photoelectric sensor is electrically connected with the sense signal terminal.

In some possible implementations, the photoelectric conversion device further includes: an element selection circuit and a gear selection circuit. The control signal includes a first element selection signal to a fourth element selection signal and a first gear selection signal to a fourth gear selection signal.

The element selection circuit is electrically connected with a first element selection signal terminal to a fourth element selection signal terminal, the first node, the second node, the third node, the fourth node and the fifth node respectively, and is configured to provide a signal of the first node, the second node, the third node or the fourth node to the fifth node in a time-sharing manner under a control of the signals from the first element selection signal terminal to the fourth element selection signal terminal, wherein a signal of the i-th element selection signal terminal is the i-th element selection signal, and i is 1 to 4.

The gear selection circuit is electrically connected with a first gear selection signal terminal to a fourth gear selection signal terminal, the fifth node, a sixth node, a seventh node, an eighth node and a ninth node respectively, and is configured to provide a signal of the fifth node to the sixth node, the seventh node, the eighth node and the ninth node in a time-sharing manner under a control of the signals from the first gear selection signal terminal to the fourth gear selection signal terminal, and a signal of the i-th gear selection signal terminal is the i-th gear selection signal.

In some possible implementations, when the i-th element selection signal is an effective level signal, all other element selection signals except the i-th element selection signal are dummy level signals, and an end time when the i-th element selection signal is an effective level signal is earlier than or equal to a start time when the (i+1)-th element selection signal is an effective level signal.

When the i-th gear selection signal is an effective level signal, all other gear selection signals except the i-th gear selection signal are dummy level signals.

When the i-th element selection signal is an effective level signal, the first gear selection signal to the fourth gear selection signal are sequentially effective level signals, and the duration of the i-th element selection signal being an effective level signal is greater than or equal to the sum of the duration of the first gear selection signal to the fourth gear selection signal being effective level signals.

In some possible implementations, when an end time at which the i-th element selection signal is an effective level signal is earlier than a start time at which the (i+1)-th element selection signal is an effective level signal, an interval time between the end time at which the i-th element selection signal is an effective level signal and the start time at which the (i+1)-th element selection signal is an effective level signal is equal to a duration for which any of the first gear selection signal to the fourth gear selection signal is an effective level signal.

In some possible implementations, the element selection circuit includes a first element selection sub-circuit to a fourth element selection sub-circuit.

The first element selection sub-circuit is electrically connected with the first element selection signal terminal, the first node and the fifth node, respectively, and is configured to provide a signal of the first node to the fifth node under a control of the signal of the first element selection signal terminal.

The second element selection sub-circuit is electrically connected with the second element selection signal terminal, the second node and the fifth node, respectively, and is configured to provide a signal of the second node to the fifth node under a control of the signal of the second element selection signal terminal.

The third element selection sub-circuit is electrically connected with the third element selection signal terminal, the third node and the fifth node, respectively, and is configured to provide a signal of the third node to the fifth node under a control of the signal of the third element selection signal terminal.

The fourth element selection sub-circuit is electrically connected with the fourth element selection signal terminal, the fourth node and the fifth node, respectively, and is configured to provide a signal of the fourth node to the fifth node under a control of the signal of the fourth element selection signal terminal.

In some possible implementations, the first element selection sub-circuit includes a first element selection transistor, the second element selection sub-circuit includes a second element selection transistor, the third element selection sub-circuit includes a third element selection transistor, and the fourth element selection sub-circuit includes a fourth element selection transistor.

A control electrode of the first element selection transistor is electrically connected with the first element selection signal terminal, a first electrode of the first element selection transistor is electrically connected with the first node, and a second electrode of the first element selection transistor is electrically connected with the fifth node.

A control electrode of the second element selection transistor is electrically connected with the second element selection signal terminal, a first electrode of the second element selection transistor is electrically connected with the second node, and a second electrode of the second element selection transistor is electrically connected with the fifth node.

A control electrode of the third element selection transistor is electrically connected with the third element selection signal terminal, a first electrode of the third element selection transistor is electrically connected with the third node, and a second electrode of the third element selection transistor is electrically connected with the fifth node.

A control electrode of the fourth element selection transistor is electrically connected with the fourth element selection signal terminal, a first electrode of the fourth element selection transistor is electrically connected with the fourth node, and a second electrode of the fourth element selection transistor is electrically connected with the fifth node.

In some possible implementations, the gear selection circuit includes a first gear selection sub-circuit to a fourth gear selection sub-circuit.

The first gear selection sub-circuit is electrically connected with the first gear selection signal terminal, the fifth node and the sixth node, respectively, and is configured to provide a signal of the fifth node to the sixth node under a control of a signal of the first gear selection signal terminal.

The second gear selection sub-circuit is electrically connected with the second gear selection signal terminal, the fifth node and the seventh node, respectively, and is configured to provide a signal of the fifth node to the seventh node under a control of a signal of the second gear selection signal terminal.

The third gear selection sub-circuit is electrically connected with the third gear selection signal terminal, the fifth node and the eighth node, respectively, and is configured to provide a signal of the fifth node to the eighth node under a control of a signal of the third gear selection signal terminal.

The fourth gear selection sub-circuit is electrically connected with the fourth gear selection signal terminal, the fifth node and the ninth node, respectively, and is configured to provide a signal of the fifth node to the ninth node under a control of a signal of the fourth gear selection signal terminal.

In some possible implementations, the first gear selection sub-circuit includes a first gear selection transistor, the second gear selection sub-circuit includes a second gear selection transistor, the third gear selection sub-circuit includes a third gear selection transistor, and the fourth gear selection sub-circuit includes a fourth gear selection transistor.

A control electrode of the first gear selection transistor is electrically connected with the first gear selection signal terminal, a first electrode of the first gear selection transistor is electrically connected with the fifth node, and a second electrode of the first gear selection transistor is electrically connected with the sixth node.

A control electrode of the second gear selection transistor is electrically connected with the second gear selection signal terminal, a first electrode of the second gear selection transistor is electrically connected with the fifth node, and a second electrode of the second gear selection transistor is electrically connected with the seventh node.

A control electrode of the third gear selection transistor is electrically connected with the third gear selection signal terminal, a first electrode of the third gear selection transistor is electrically connected with the fifth node, and a second electrode of the third gear selection transistor is electrically connected with the eighth node.

A control electrode of the fourth gear selection transistor is electrically connected with the fourth gear selection signal terminal, a first electrode of the fourth gear selection transistor is electrically connected with the fifth node, and a second electrode of the fourth gear selection transistor is electrically connected with the ninth node.

In some possible implementations, the voltage signals include a first voltage signal to a fourth voltage signal, and the current conversion device includes a sample circuit and a filter circuit.

The sample circuit is electrically connected with the sixth node to a thirteenth node and a reference signal terminal respectively, and is configured to sample the signals from the sixth node to the ninth node, generate a first initial voltage signal to a fourth initial voltage signal corresponding to the current signals, and respectively provide the first initial voltage signal to the fourth initial voltage signal corresponding to the current signals to the tenth node to the thirteenth node.

The filter circuit is electrically connected with the tenth node to the thirteenth node, a ground terminal and the control device respectively, and is configured to filter the first initial voltage signal to the fourth initial voltage signal corresponding to the current signals, generate the first voltage signal to the fourth voltage signal corresponding to the current signals, and provide the first voltage signal to the fourth voltage signal corresponding to the current signals to the control device respectively.

In some possible implementations, the sample circuit includes a first sample sub-circuit, a second sample sub-circuit, a third sample sub-circuit, and a fourth sample sub-circuit.

The first sample sub-circuit is electrically connected with the sixth node, the tenth node and the reference signal terminal respectively, and is configured to sample the signal of the sixth node, generate the first initial voltage signal corresponding to the current signals, and provide the first initial voltage signal corresponding to the current signals to the tenth node.

The second sample sub-circuit is electrically connected with the seventh node, the eleventh node and the reference signal terminal respectively, and is configured to sample the signal of the seventh node, generate the second initial voltage signal corresponding to the current signals, and provide the second initial voltage signal corresponding to the current signals to the eleventh node.

The third sample sub-circuit is electrically connected with the eighth node, the twelfth node and the reference signal terminal respectively, and is configured to sample the signal of the eighth node, generate the third initial voltage signal corresponding to the current signals, and provide the third initial voltage signal corresponding to the current signals to the twelfth node.

The fourth sample sub-circuit is electrically connected with the ninth node, the thirteenth node and the reference signal terminal respectively, and is configured to sample the signal of the ninth node, generate the fourth initial voltage signal corresponding to the current signal, and provide the fourth initial voltage signal corresponding to the current signals to the thirteenth node.

In some possible implementations, the first sample sub-circuit includes a first operational amplifier, a first sample resistor, and a first feedback capacitor. The second sample sub-circuit includes a second operational amplifier, a second sample resistor, and a second feedback capacitor. The third sample sub-circuit includes a third operational amplifier, a third sample resistor, and a third feedback capacitor. The fourth sample sub-circuit includes a fourth operational amplifier, a fourth sample resistor, and a fourth feedback capacitor.

A non-inverting input terminal of the first operational amplifier is electrically connected with the reference signal terminal, an inverting input terminal of the first operational amplifier is electrically connected with the sixth node, and an output terminal of the first operational amplifier is electrically connected with the tenth node.

A first terminal of the first sample resistor is electrically connected with the sixth node and a second terminal of the first sample resistor is electrically connected with the tenth node.

A first terminal of the first feedback capacitor is electrically connected with the sixth node and a second terminal of the first feedback capacitor is electrically connected with the tenth node.

A non-inverting input terminal of the second operational amplifier is electrically connected with the reference signal terminal, an inverting input terminal of the second operational amplifier is electrically connected with the seventh node, and an output terminal of the second operational amplifier is electrically connected with the eleventh node.

A first terminal of the second sample resistor is electrically connected with the seventh node and a second terminal of the second sample resistor is electrically connected with the eleventh node.

A first terminal of the second feedback capacitor is electrically connected with the seventh node and a second terminal of the second feedback capacitor is electrically connected with the eleventh node.

A non-inverting input terminal of the third operational amplifier is electrically connected with the reference signal terminal, an inverting input terminal of the third operational amplifier is electrically connected with the eighth node, and an output terminal of the third operational amplifier is electrically connected with the twelfth node.

A first terminal of the third sample resistor is electrically connected with the eighth node and a second terminal of the third sample resistor is electrically connected with the twelfth node.

A first terminal of the third feedback capacitor is electrically connected with the eighth node and a second terminal of the third feedback capacitor is electrically connected with the twelfth node.

A non-inverting input terminal of the fourth operational amplifier is electrically connected with the reference signal terminal, an inverting input terminal of the fourth operational amplifier is electrically connected with the ninth node, and an output terminal of the fourth operational amplifier is electrically connected with the thirteenth node.

A first terminal of the fourth sample resistor is electrically connected with the ninth node, and a second terminal of the fourth sample resistor is electrically connected with the thirteenth node.

A first terminal of the fourth feedback capacitor is electrically connected with the ninth node, and a second terminal of the fourth feedback capacitor is electrically connected with the thirteenth node.

A resistance R1 of the first sample resistor, a resistance R2 of the second sample resistor, a resistance R3 of the third sample resistor, and a resistance R4 of the fourth sample resistor: R1=K×R2=K2×R3=K3×R4, a K is a positive integer greater than 1.

In some possible implementations, the filter circuit includes a first filter sub-circuit, a second filter sub-circuit, a third filter sub-circuit, and a fourth filter sub-circuit.

The first filter sub-circuit is electrically connected with the tenth node, the ground terminal, and the control device respectively, and is configured to filter the signal of the tenth node, generate the first voltage signal corresponding to the current signal, and provide the first voltage signal corresponding to the current signals to the control device.

The second filter sub-circuit is electrically connected with the eleventh node, the ground terminal, and the control device respectively, and is configured to filter the signal of the eleventh node, generate the second voltage signal corresponding to the current signal, and provide the second voltage signal corresponding to the current signals to the control device.

The third filter sub-circuit is electrically connected with the twelfth node, the ground terminal, and the control device respectively, and is configured to filter the signal of the twelfth node, generate the third voltage signal corresponding to the current signals, and provide the third voltage signal corresponding to the current signals to the control device.

The fourth filter sub-circuit is electrically connected with the thirteenth node, the ground terminal, and the control device respectively, and is configured to filter the signal of the thirteenth node, generate the fourth voltage signal corresponding to the current signal, and provide the fourth voltage signal corresponding to the current signals to the control device.

In some possible implementations, the first filter sub-circuit includes a first filter resistor and a first filter capacitor; the second filter sub-circuit includes a second filter resistor and a second filter capacitor; the third filter sub-circuit includes a third filter resistor and a third filter capacitor; the fourth filter sub-circuit includes a fourth filter resistor and a fourth filter capacitor.

A first terminal of the first filter resistor is electrically connected with the tenth node, a second terminal of the first filter resistor is electrically connected with the control device and the first terminal of the first filter capacitor respectively, and a second terminal of the first filter capacitor is electrically connected with the ground terminal.

A first terminal of the second filter resistor is electrically connected with the eleventh node, a second terminal of the second filter resistor is electrically connected with the control device and the first terminal of the second filter capacitor respectively, and a second terminal of the second filter capacitor is electrically connected with the ground terminal.

A first terminal of the third filter resistor is electrically connected with the twelfth node, a second terminal of the third filter resistor is electrically connected with the control device and the first terminal of the third filter capacitor respectively, and a second terminal of the third filter capacitor is electrically connected with the ground terminal.

A first terminal of the fourth filter resistor is electrically connected with the thirteenth node, a second terminal of the fourth filter resistor is electrically connected with the control device and the first terminal of the fourth filter capacitor respectively, and a second terminal of the fourth filter capacitor is electrically connected with the ground terminal.

In some possible implementations, the control device includes an analog-to-digital conversion element, a controller, and a level converter.

The analog-to-digital conversion element is electrically connected with the filter circuit and is configured to convert the first voltage signal to the fourth voltage signal corresponding to the current signals into the first digital voltage signal to the fourth digital voltage signal corresponding to the current signal.

The controller is electrically connected with the analog-to-digital conversion element and is configured to generate a first initial element selection signal to a fourth initial element selection signal and a first initial gear selection signal to a fourth initial gear selection signal, and generate the chromaticity parameters of the light according to the first digital voltage signal to the fourth digital voltage signal corresponding to the current signal.

The level converter is electrically connected with the controller, the first element selection signal terminal to the fourth element selection signal terminal and the first gear selection signal terminal to the fourth gear selection signal terminal, is configured to: perform level conversion on the first initial element selection signal to the fourth initial element selection signal, generate the first gear selection signal to the fourth gear selection signal terminal, provide the first element selection signal to the fourth element selection signal to the first element selection signal terminal to the fourth element selection signal terminal respectively, perform level conversion on the first initial gear selection signal to the fourth initial gear selection signal terminal, generate the first gear selection signal to the fourth gear selection signal, and provide the first gear selection signal to the fourth gear selection signal to the first gear selection signal terminal to the fourth gear selection signal terminal respectively.

In some possible implementations, the analog-to-digital conversion element includes a signal selector, a signal buffer, and an analog-to-digital converter.

The signal selector is electrically connected with the filter circuit and the signal buffer respectively, and is configured to transmit the first voltage signal to the fourth voltage signal corresponding to the current signals to the signal buffer in a time-sharing manner.

The signal buffer is configured to store the first voltage signal to the fourth voltage signal corresponding to the time-sharing input current signal of the signal selector.

The analog-to-digital converter is electrically connected with the signal buffer and is configured to convert the first voltage signal to the fourth voltage signal corresponding to the current signals in the signal buffer into the first digital voltage signal to the fourth digital voltage signal corresponding to the current signals in a time-sharing manner.

In some possible implementations, a voltage value of the signal at the reference signal terminal is constant, and the voltage value of the signal at the reference signal terminal is less than the maximum input voltage value of the analog-to-digital converter and greater than the minimum input voltage value of the analog-to-digital converter.

In some possible implementations, the controller includes eight first interfaces, the first interfaces are configured as standard general purpose input and output ports.

The eight first interfaces are electrically connected with the level converter and are configured to transmit the first initial element selection signal to the fourth initial element selection signal and the first initial gear selection signal to the fourth initial gear selection signal to the level converter, respectively.

In some possible implementations, the controller further includes a first digital register to a fourth digital register.

The controller is configured to store a first threshold voltage value and a second threshold voltage value in advance, judge whether the voltage values of the first digital voltage signal to the fourth digital voltage signal corresponding to the i-th current signal meet a corresponding threshold condition sequentially, convert the digital voltage signal corresponding to the i-th current signal meeting the corresponding threshold condition into a full-range digital voltage signal, to store the converted full-range digital voltage signal in the i-th digital register, and generate the chromaticity parameters of the light according to the full-range digital voltage signal in the first digital register to the fourth digital register.

The threshold condition corresponding to the first digital voltage signal corresponding to the i-th current signal is greater than the second threshold voltage value, the threshold condition corresponding to the second digital voltage signal and the third digital voltage signal corresponding to the i-th current signal is greater than the first threshold voltage value and less than the second threshold voltage value, the threshold condition corresponding to the fourth digital voltage signal corresponding to the i-th current signal is less than the first threshold voltage value, wherein the first threshold voltage value is greater than the minimum input voltage value of the analog-to-digital converter and the second threshold voltage value is less than the maximum input voltage value of the mode converter.

The difference between the minimum input voltage value of the analog-to-digital converter and the first threshold voltage value is equal to the difference between the maximum output voltage value of the analog-to-digital converter and the second threshold voltage value.

In some possible implementations, the controller is configured in accordance with a formula VDcount=VDj/Gainj, a j-th digital voltage signal is converted into a full-range digital voltage signal Dcount, wherein the j-th digital voltage signal is a digital voltage signal corresponding to the i-th current signal meeting the threshold condition, Gainj is an amplification factor, Gainj=Kj, VDcount is the voltage value of the full-range digital voltage signal, VDj is the voltage value of the j-th digital voltage signal, j=1, 2, 3 or 4.

In some possible implementations, the control device further includes: a transmission interface connected to the controller and the transmission interface is configured as a serial interface and configured to transmit chromaticity parameters of the light generated by the controller.

The transmission interface includes: I2C interface or SPI interface.

In a second aspect, the present disclosure also provides a display substrate, including a display area and a non-display area, wherein the non-display area is provided with the aforementioned light detection structure.

In some possible implementations, the non-display area includes a bezel area and a bonding area, the bonding area is located on a side of the bezel area away from the display area, a photoelectric conversion device in the light detection structure is provided in the bezel area, and a current conversion device and a control device in the light detection structure are provided in the bonding area.

In a third aspect, the present disclosure further provides a display device, including the aforementioned display substrate.

Among some possible implementations, it further includes an application program.

The application program is electrically connected with the light detection structure in the display substrate, and is configured to obtain the chromaticity parameters of the light.

In a fourth aspect, the present disclosure further provides a light detection method applied in the aforementioned light detection structure, and the method includes: generating, by the control device, a control signal; converting, by the photoelectric conversion device, the incident light of N colors into current signals, and providing, by the photoelectric conversion device, the current signals under control of the control signal; converting, by the current conversion device, the current signals into voltage signals corresponding to the current signals; and generating, by the control device, chromaticity parameters of the light according to the voltage signals corresponding to the current signals, wherein the chromaticity parameters include brightness, color temperature and color coordinates.

In some possible implementations, the converting, by the photoelectric conversion device, the incident light of N colors into current signals includes:
  converting the incident light of a first color into a first current signal and writing the first current signal into a first node, converting the incident light of a second color into a second current signal and writing the second current signal into a second node, converting the incident light of a third color into a third current signal and writing the third current signal into a third node, and converting the incident light of a fourth color into a fourth current signal and writing the fourth current signal into a fourth node.

The providing, by the photoelectric conversion device, the current signals to the current conversion device under control of the control signal includes:
  providing a signal of the first node, the second node, the third node or the fourth node to the fifth node in a time-sharing manner under the control of signals from the first element selection signal terminal to the fourth element selection signal terminal;
  providing a signal of the fifth node to the sixth node, the seventh node, the eighth node and the ninth node in a time-sharing manner under the control of signals from the first gear selection signal terminal to the fourth gear selection signal terminal;
  the providing a signal of the first node, the second node, the third node or the fourth node to a fifth node in a time-sharing manner under the control of signals from the first element selection signal terminal to the fourth element selection signal terminal includes: providing the signals of the first node to the fifth node under the control of the signals from the first element selection signal terminal, providing the signals of the second node to the fifth node under the control of the signals from the second element selection signal terminal, providing the signals of the third node to the fifth node under the control of the signals from the third element selection signal terminal, and providing the signals of the fourth node to the fifth node under the control of the signals from the fourth element selection signal terminal;

the providing a signal of the fifth node to a sixth node, a seventh node, an eighth node and a ninth node in the time-sharing manner under the control of signals from the first gear selection signal terminal to the fourth gear selection signal terminal includes: providing the signal of the fifth node to the sixth node under the control of the signal from the first gear selection signal terminal, providing the signal of the fifth node to the seventh node under the control of the signal from the second gear selection signal terminal, providing the signal of the fifth node to the eighth node under the control of the signal from the third gear selection signal terminal, and providing the signal of the fifth node to the ninth node under the control of the signal from the fourth gear selection signal terminal.

In some possible implementations, the voltage signals include a first voltage signal to a fourth voltage signal, and the converting, by the current conversion device, the current signals into voltage signals corresponding to the current signals includes:

sampling the signals of the sixth node to the ninth node, generating the first initial voltage signal to the fourth initial voltage signal corresponding to the current signals, and providing the first initial voltage signal to the fourth initial voltage signal corresponding to the current signals to the tenth node to the thirteenth node respectively;

filtering the first initial voltage signal to the fourth initial voltage signal corresponding to the current signals, generating the first voltage signal to the fourth voltage signal corresponding to the current signals, and providing the first voltage signal to the fourth voltage signal corresponding to the current signals to the control device respectively;

the sampling the signals of the sixth node to the ninth node, generating the first initial voltage signal to the fourth initial voltage signal corresponding to the current signals, and providing the first initial voltage signal to the fourth initial voltage signal corresponding to the current signals to a tenth node to a thirteenth node respectively includes: sampling the signal of the sixth node to generate the first initial voltage signal corresponding to the current signals, providing the first initial voltage signal corresponding to the current signals to the tenth node, sampling the signal of the seventh node to generate the second initial voltage signal corresponding to the current signals, providing the second initial voltage signal corresponding to the current signals to the eleventh node, sampling the signal of the eighth node to generate the third initial voltage signal corresponding to the current signals, providing the third initial voltage signal corresponding to the current signals to the twelfth node, sampling the signal of the ninth node to generate the fourth initial voltage signal corresponding to the current signals, and providing the fourth initial voltage signal corresponding to the current signals to the thirteenth node;

the filtering the first initial voltage signal to the fourth initial voltage signal corresponding to the current signals, generating the first voltage signal to the fourth voltage signal corresponding to the current signals, and providing the first voltage signal to the fourth voltage signal corresponding to the current signals to the control device respectively includes: filtering the signal of the tenth node, generating the first voltage signal corresponding to the current signals, and providing the first voltage signal corresponding to the current signals to the control device, filtering the signal of the eleventh node, generating the second voltage signal corresponding to the current signals, and providing the second voltage signal corresponding to the current signals to the control device, filtering the signal of the twelfth node, generating the third voltage signal corresponding to the current signals, and providing the third voltage signal corresponding to the current signals to the control device, filtering the signal of the thirteenth node, and generating the fourth voltage signal corresponding to the current signals and providing the fourth voltage signal corresponding to the current signals to the control device.

In some possible implementations, the generating, by the control device, chromaticity parameters of the light according to the voltage signals corresponding to the current signals includes:

converting the first voltage signal to the fourth voltage signal corresponding to the current signals into the first digital voltage signal to the fourth digital voltage signal corresponding to the current signals;

generating the chromaticity parameters of the light according to the first digital voltage signal to the fourth digital voltage signal corresponding to the current signals.

In some possible implementations, the generating the chromaticity parameters of the light according to the first digital voltage signal to the fourth digital voltage signal corresponding to the current signals includes:

storing a first threshold voltage value and a second threshold voltage value in advance;

sequentially judging whether the voltage values of the first digital voltage signal to the fourth digital voltage signal corresponding to the i-th current signal meet the corresponding threshold condition, converting the digital voltage signal corresponding to the i-th current signal meeting the corresponding threshold condition into a full-range digital voltage signal, and storing the converted full-range digital voltage signal in the i-th digital register;

generating the chromaticity parameters of light according to the full-range digital voltage signals in the first digital register to the fourth digital register;

the threshold condition corresponding to the first digital voltage signal corresponding to the i-th current signal is greater than the second threshold voltage value, the threshold condition corresponding to the second digital voltage signal and the third digital voltage signal corresponding to the i-th current signal is greater than the first threshold voltage value and less than the second threshold voltage value, and the threshold condition corresponding to the fourth digital voltage signal corresponding to the i-th current signal is less than the first threshold voltage value, wherein the first threshold voltage value is greater than the minimum input voltage value of the analog-to-digital converter and the second threshold voltage value is less than the maximum input voltage value of the mode converter.

In some possible implementations, converting the digital voltage signal corresponding to the i-th current signal meeting the corresponding threshold condition into a full-range digital voltage signal includes:

according to the formula $V_{Dcount}=V_{Dj}/Gain_j$, converting the j-th digital voltage signal into the full-range digital voltage signal Dcount, wherein the j-th digital voltage signal is the digital voltage signal corresponding to the i-th current signal meeting the threshold condition, $Gain_j$ is an amplification factor, $Gain_j=K^j$, $V_{Dcount}$ is the voltage value of the full-range digital voltage signal, $V_{Dj}$ is the voltage value of the j-th digital voltage signal, j=1, 2, 3 or 4.

Other aspects may be understood upon reading and understanding drawings and detailed description.

BRIEF DESCRIPTION OF DRAWINGS

Accompanying drawings are used for providing understanding of technical solutions of the present disclosure, and constitute a part of the specification. They are used for explaining the technical solutions of the present disclosure together with the embodiments of the present disclosure, but do not constitute a limitation on the technical solutions of the present disclosure.

DETAILED DESCRIPTION

Figure 1:
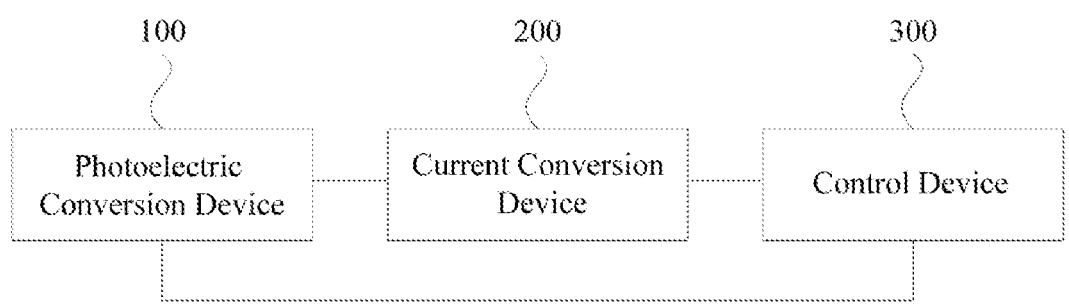
FIG. 1 is a schematic diagram of a structure of a light detection structure provided by an embodiment of the present disclosure.

To make objectives, technical solutions, and advantages of the present disclosure more clear, embodiments of the present disclosure will be described in detail below with reference to the accompanying drawings. It is to be noted that implementations may be implemented in multiple different forms. Those of ordinary skills in the art may easily understand such a fact that modes and contents may be transformed into various forms without departing from purpose and scope of the present disclosure. Therefore, the present disclosure should not be explained as being limited to contents described in following implementations only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in an actual process, but are not limited thereto. For example, a width-to-length ratio of a channel, a thickness and a pitch of each film layer, and a width and a pitch of each signal line may be adjusted according to actual needs. A quantity of pixels in a display substrate and a quantity of sub-pixels in each pixel are not limited to numbers shown in the drawings. The drawings described in the present disclosure are schematic structural diagrams only, and one mode of the present disclosure is not limited to shapes, numerical values, or the like shown in the drawings.

Ordinal numerals such as "first", "second", and "third" in the specification are set to avoid confusion of constituent elements, but not set to make a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements are changed as appropriate according to directions for describing various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, a detachable connection, or an integrated connection; it may be a mechanical connection or an electrical connection; it may be a direct mutual connection, or an indirect connection through a middleware, or internal communication between two elements. Those of ordinary skills in the art may understand specific meanings of these terms in the present disclosure according to specific situations.

In the specification, a transistor refers to an element which at least includes three terminals, i.e., a gate electrode, a drain electrode, and a source electrode. The transistor has a channel area between the drain electrode (drain electrode terminal, drain area, or drain) and the source electrode (source electrode terminal, source area, or source), and a current can flow through the drain electrode, the channel area, and the source electrode. It is to be noted that, in the specification, the channel area refers to an area through which the current mainly flows.

In the specification, a first electrode may be a drain electrode, and a second electrode may be a source electrode; or, a first electrode may be a source electrode, and a second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, an "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include electrodes and wirings, but also include switch elements (such as transistors), resistors, inductors, capacitors, other elements with various functions, etc.

In the specification, "parallel" refers to a state in which an angle formed by two straight lines is −10° or more and 10° or less, and thus also includes a state in which the angle is −5° or more and below 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

"Being disposed in a same layer" adopted in this specification means that a structure formed by patterning two (or more than two) structures through a same patterning process, and their materials may be the same or different. For example, materials of forming precursors of multiple types of structures disposed in a same layer are the same, and finally formed materials may be the same or different.

A triangle, rectangle, trapezoid, pentagon, or hexagon, etc. in this specification are not strictly defined, and it may be an approximate triangle, rectangle, trapezoid, pentagon, or hexagon, etc. There may be some small deformation caused by tolerance, and there may be chamfer, arc edge, and deformation, etc.

In the present disclosure, "about" refers to that a boundary is defined not so strictly and numerical values within process and measurement error ranges are allowed.

With a wide application of artificial intelligence, in order to increase a better experience, it is required to detect not only a brightness of ambient light, but also a color temperature of ambient light, so as to better customize customers' applications in a specific environment according to their environments. The light parameters available in the display products are relatively single, which cannot meet the needs of artificial intelligence.

FIG. 1 is a schematic diagram of a structure of a light detection structure provided by an embodiment of the present disclosure. As shown in FIG. 1, the light detection structure provided by an embodiment of the present disclosure may include a photoelectric conversion device 100, a current conversion device 200, and a control device 300.

As shown in FIG. 1, the photoelectric conversion device 100 may be electrically connected with the current conversion device 200, and is configured to convert incident light of N colors into current signals, and to supply the current signals to the current conversion device 200 under a control of a control signal, where N is a positive integer greater than or equal to 1. A current conversion device 200 configured to convert current signals into voltage signals corresponding to the current signal; the control device 300 is electrically connected with the photoelectric conversion device 100 and the current conversion device 200, respectively, and is configured to generate control signals and generate chromaticity parameters of light based on voltage signals corresponding to the current signals.

In an exemplary embodiment, the chromaticity parameters may include brightness, color temperature, and color coordinates, and the chromaticity parameters may also include other light parameters, which are not limited by the present disclosure.

In an exemplary embodiment, the incident light of N colors may be ambient light, and may include multiple types of red light, green light, blue light, or white light, without any limitation in this disclosure.

The light detection structure provided by an embodiment of the present disclosure includes the photoelectric conversion device, the current conversion device and the control device; the photoelectric conversion device is electrically connected with the current conversion device and is configured to convert the incident light of N colors into current signals and provide the current signals to the current conversion device under the control of the control signal; a current conversion device is configured to convert the current signals into voltage signals corresponding to the current signals; the control device is electrically connected with the photoelectric conversion device and the current conversion device respectively, and is configured to generate control signals and generate chromaticity parameters of light according to voltage signals corresponding to the current signals, wherein the chromaticity parameters include brightness, color temperature and color coordinates. Through the cooperation of the photoelectric conversion device, the current conversion device and, the control device, the present disclosure obtains chromaticity parameters of light according to the incident light of N colors, and the obtained light parameters are rich, so that the light detection structure can be applied to display products to meet the requirements of artificial intelligence.

Figure 2:
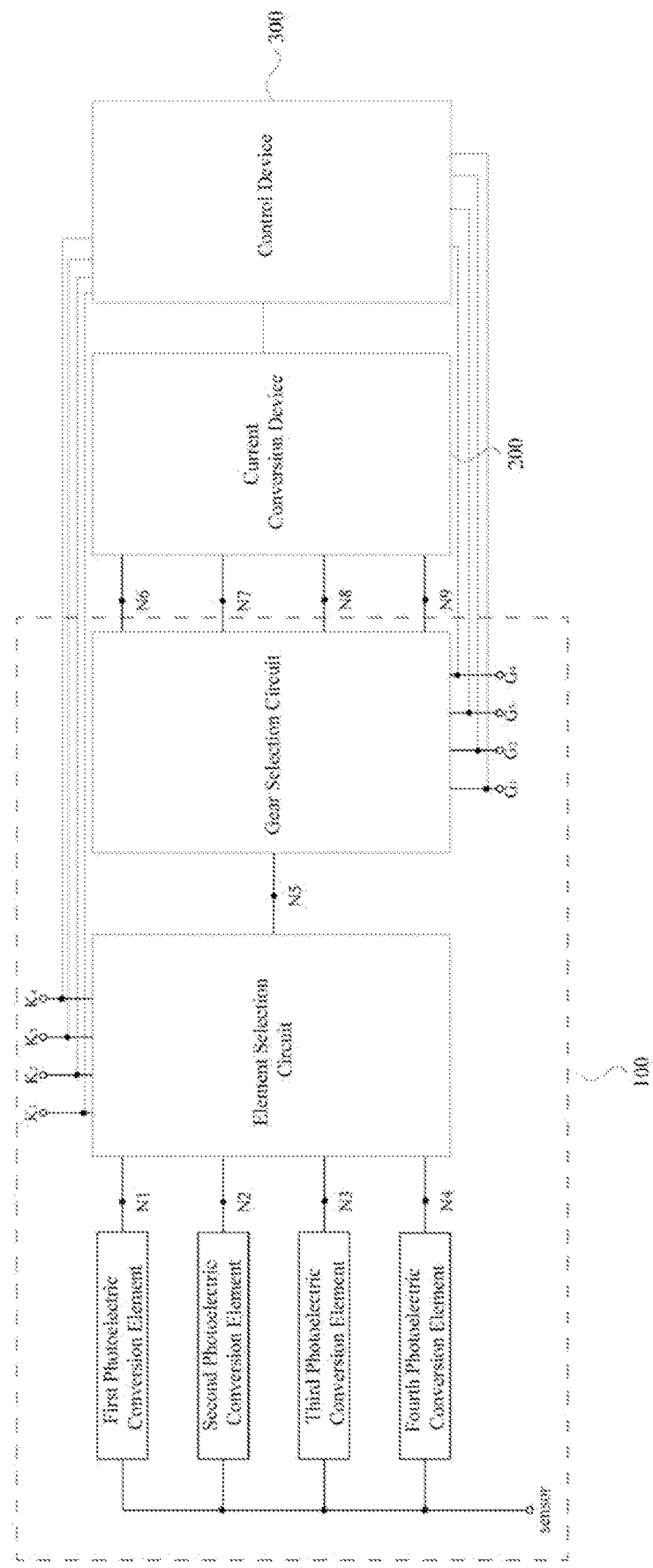
FIG. 2 is a schematic diagram of a structure of a photoelectric conversion device provided by an exemplary embodiment.
Figure 3:
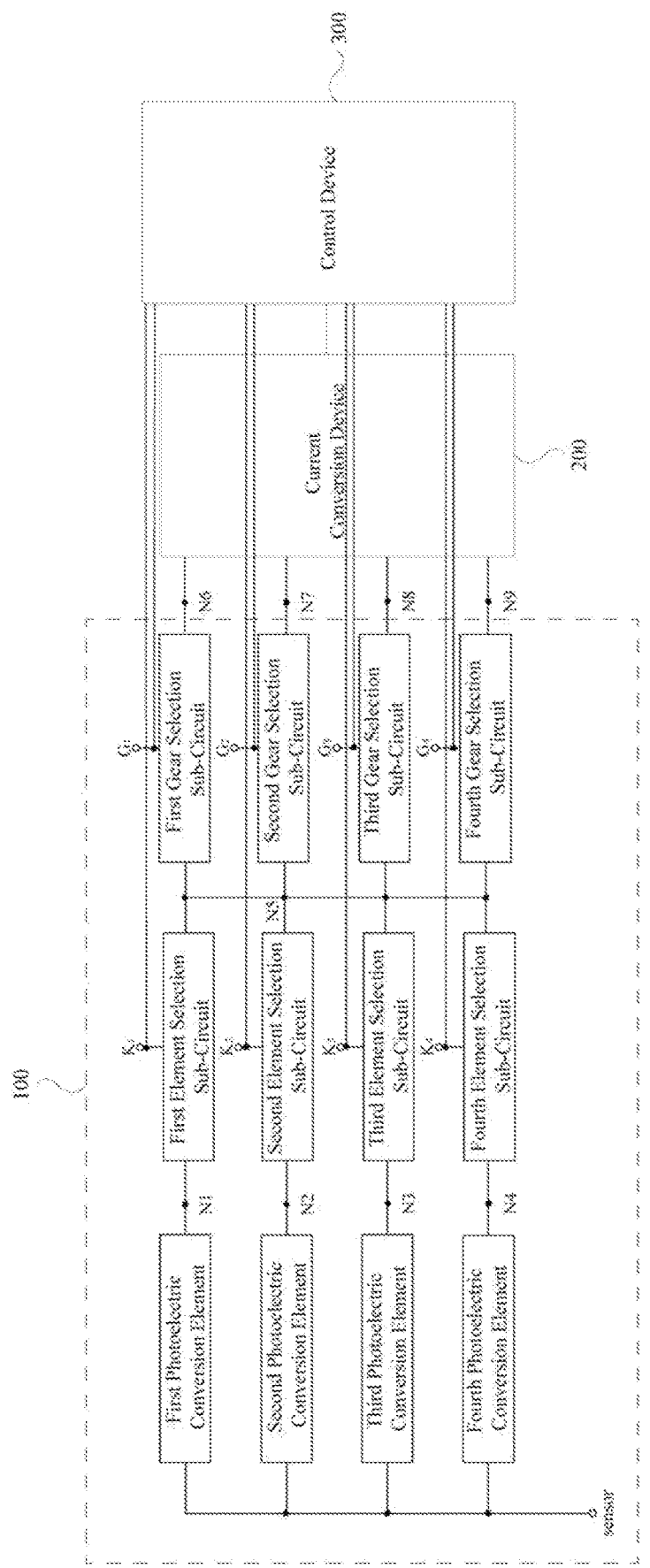
FIG. 3 is a schematic diagram of a structure of a photoelectric conversion device provided by another exemplary embodiment.
Figure 4:
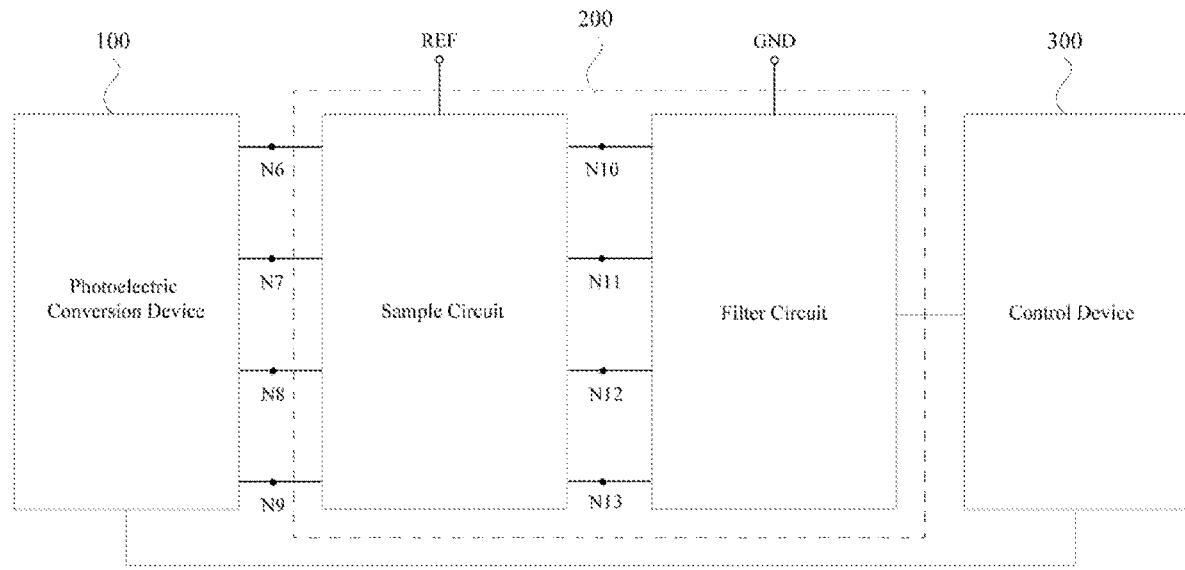
FIG. 4 is a schematic diagram of a structure of a current conversion device provided by an exemplary embodiment.
Figure 5:
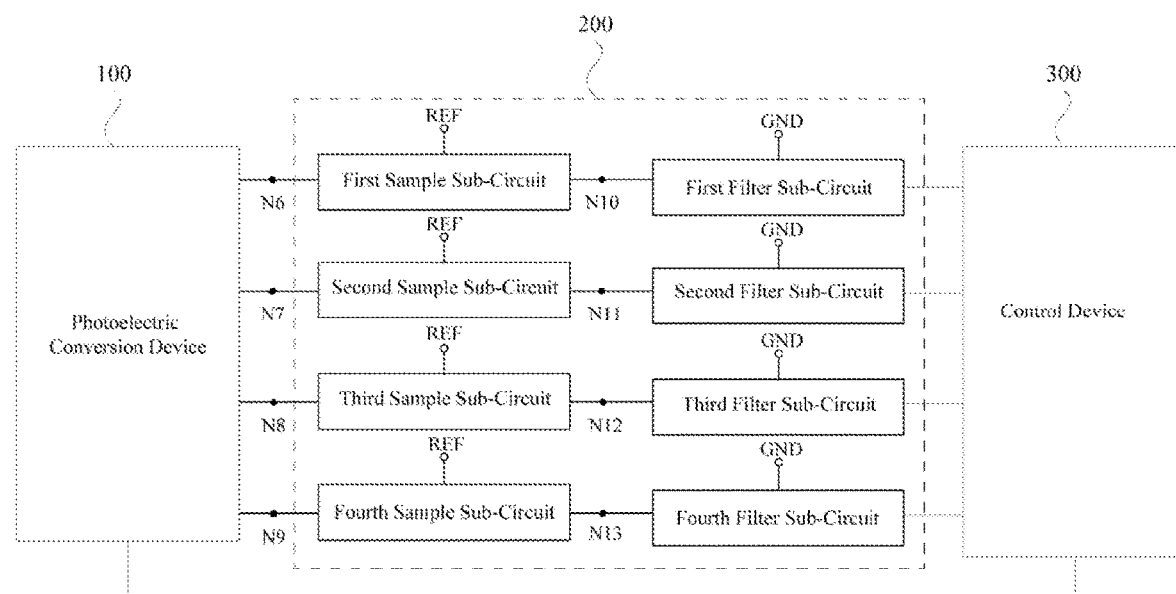
FIG. 5 is a schematic diagram of a structure of a current conversion device provided by another exemplary embodiment.
Figure 6:
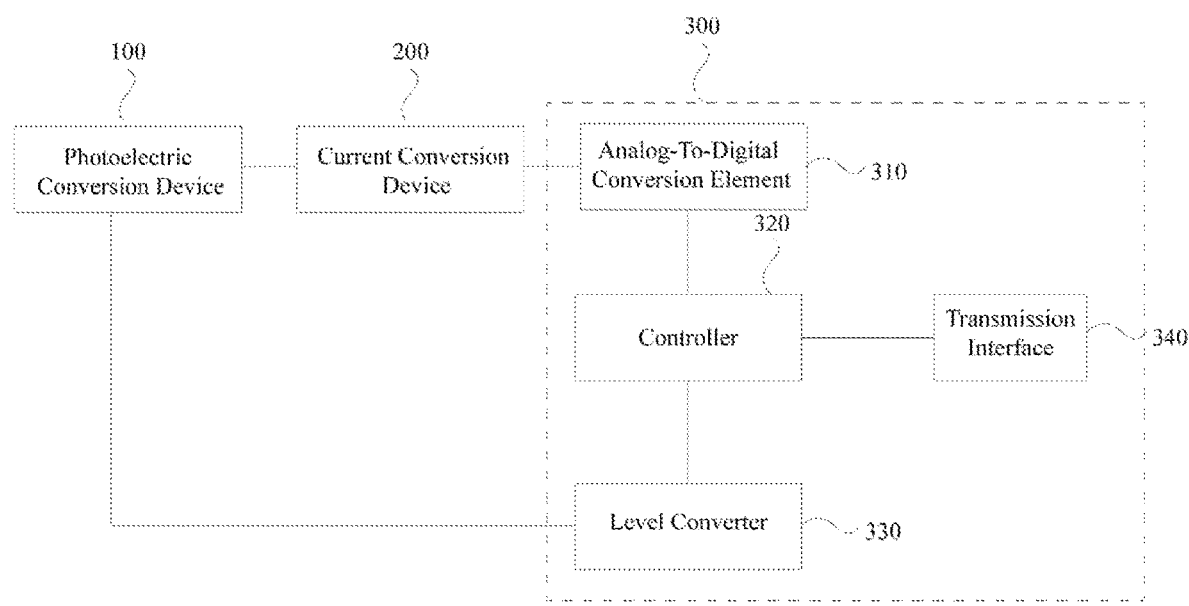
FIG. 6 is a schematic diagram of a structure of a control device provided by an exemplary embodiment.
Figure 7:
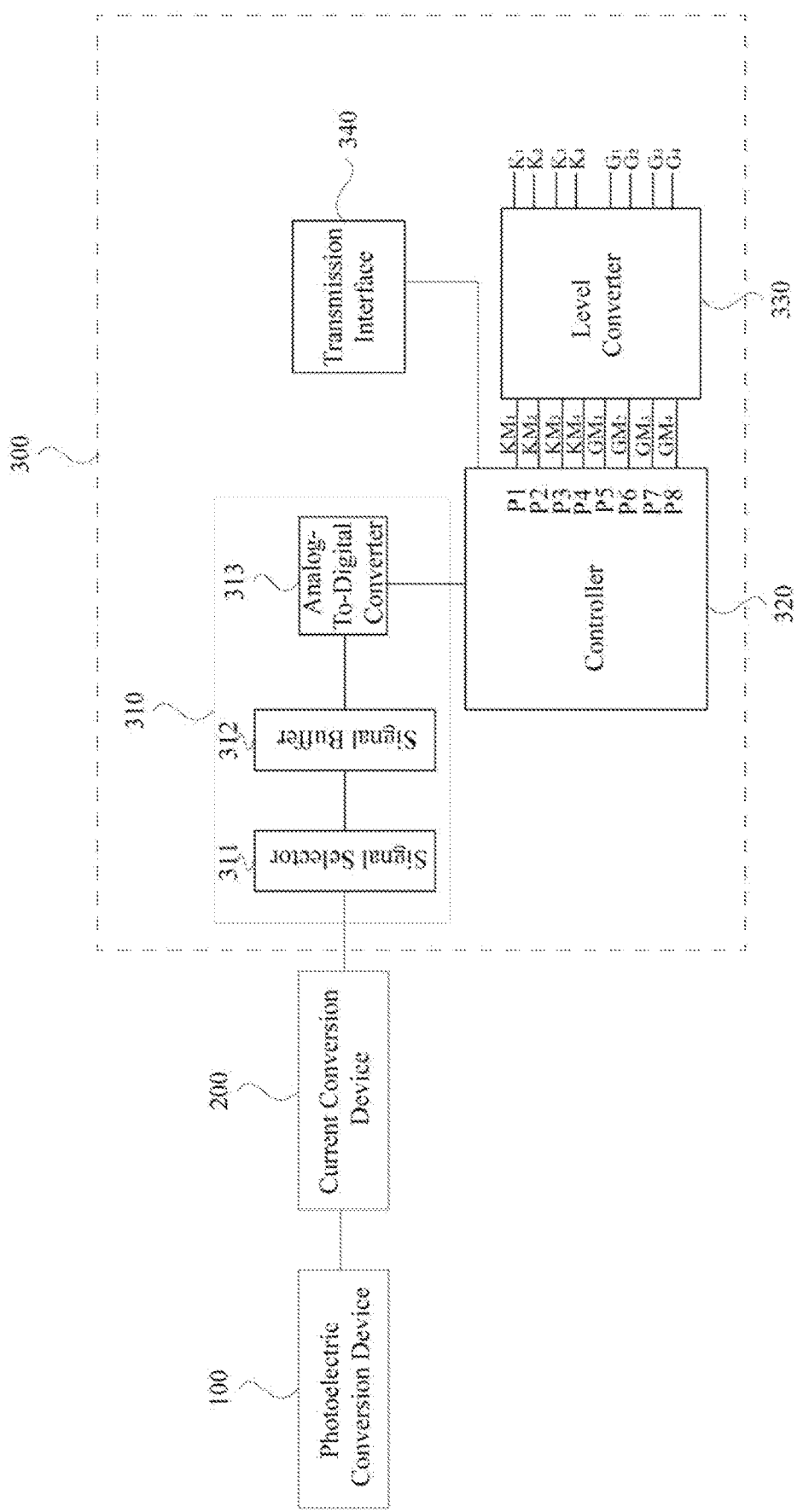
FIG. 7 is a schematic diagram of a structure of a control device provided by another exemplary embodiment.
Figure 8:
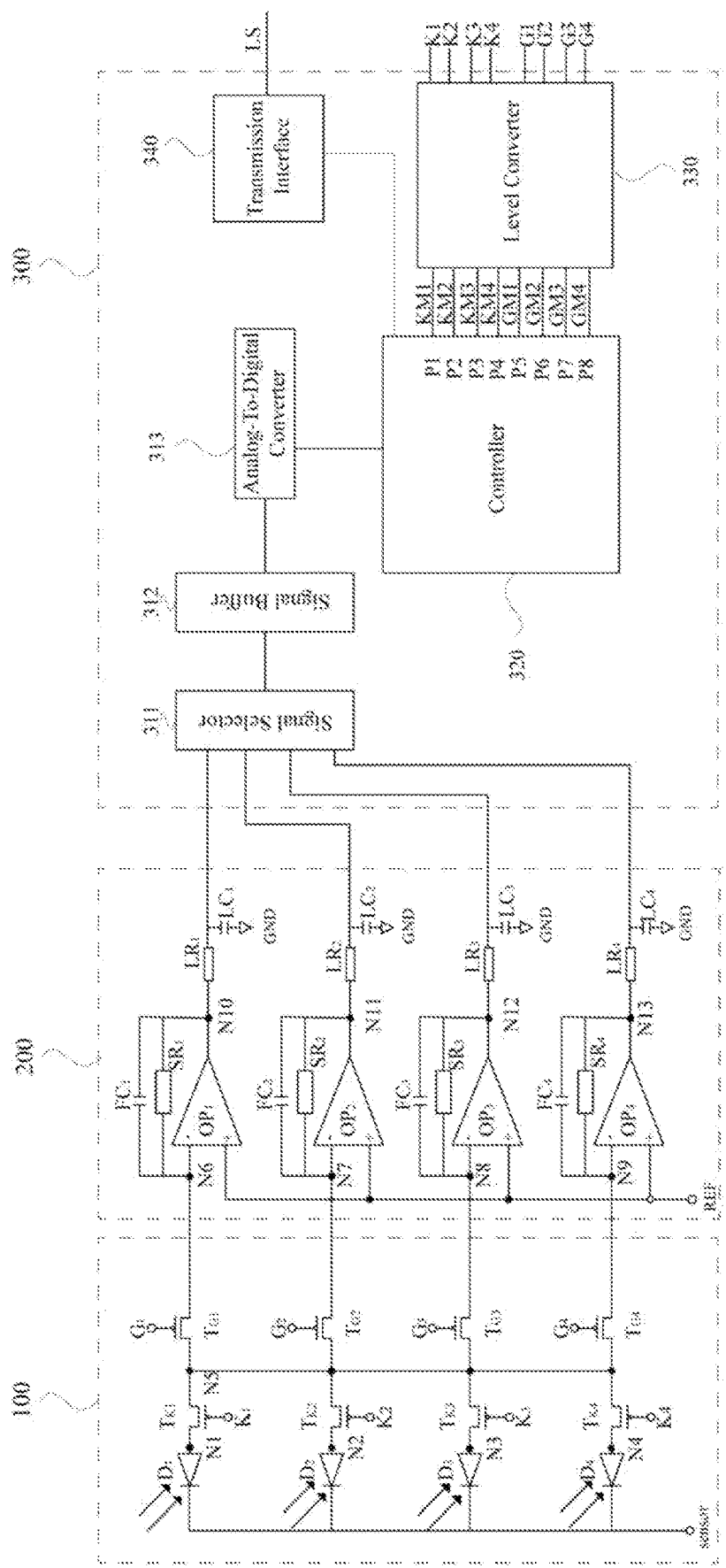
FIG. 8 is an equivalent schematic diagram of a light detection device provided by an exemplary embodiment.

FIG. 2 is a schematic diagram of a structure of a photoelectric conversion device provided by an exemplary embodiment, FIG. 3 is a schematic diagram of a structure of a photoelectric conversion device provided by another exemplary embodiment, FIG. 4 is a schematic diagram of a structure of a current conversion device provided by an exemplary embodiment, FIG. 5 is a schematic diagram of a structure of a current conversion device provided by another exemplary embodiment, FIG. 6 is a schematic diagram of a structure of a control device provided by an exemplary embodiment, FIG. 7 is a schematic diagram of a structure of a control device provided by another exemplary embodiment, and FIG. 8 is an equivalent schematic diagram of a light detection device provided by an exemplary embodiment. As shown in FIG. 2 and FIG. 3, when N=4 the photoelectric conversion device 100 includes four photoelectric conversion elements; the four photoelectric conversion elements include a first photoelectric conversion element, a second photoelectric conversion element, a third photoelectric conversion element, and a fourth photoelectric conversion element, and the current signal includes a first current signal, a second current signal, a third current signal, and a fourth current signal.

As shown in FIG. 2 and FIG. 3, the first photoelectric conversion element is electrically connected with a sense signal terminal sensor and a first node N1, respectively, and is configured to convert the incident light of a first color into a first current signal and write the first current signal into the first node N1.

As shown in FIG. 2 and FIG. 3, the second photoelectric conversion element is electrically connected with the sense signal terminal sensor and a second node N2, respectively, and is configured to convert the incident light of a second color into a second current signal and write the second current signal into the second node N2.

As shown in FIG. 2 and FIG. 3, the third photoelectric conversion element is electrically connected with the sense signal terminal sensor and the a node N3, respectively, is configured to convert the incident light of a third color into a third current signal and write the third current signal into the third node N3.

As shown in FIG. 2 and FIG. 3, the fourth photoelectric conversion element is electrically connected with the sense signal terminal sensor and a fourth node N4, respectively, is configured to convert the incident light of a fourth color into a fourth current signal and write the fourth current signal into the fourth node N4.

In an exemplary embodiment, the first color, the second color, the third color, and the fourth color are one of red, green, blue, and white, and the first color, the second color, the third color, and the fourth color are different colors, and a voltage value of a signal of the sense signal terminal sensor is constant.

As shown in FIG. 8, the first photoelectric conversion element includes a first photoelectric sensor $D_1$, the second photoelectric conversion element includes a second photoelectric sensor $D_2$, the third photoelectric conversion element includes a third photoelectric sensor $D_3$, and the fourth photoelectric conversion element includes a fourth photoelectric sensor $D_4$.

In an exemplary embodiment, one of the electrodes of the first photoelectric sensor $D_1$ to the fourth photoelectric sensor $D_4$ is connected with the common voltage terminal, and the other electrode is electrically connected with the current conversion circuit. In FIG. 8, illustration is made by taking a case in which a cathode of the first photoelectric sensor $D_1$ to the fourth photoelectric sensor $D_4$ is connected with the common voltage terminal, and a anode of the first photoelectric sensor $D_1$ to the fourth photoelectric sensor $D_4$ is electrically connected with the current conversion circuit as an example.

In an exemplary embodiment, a photoelectric sensor may be a photoelectric diode.

In an exemplary embodiment, the anode of the first photoelectric sensor $D_1$ is electrically connected with the first node N1, the cathode of the first photoelectric sensor $D_1$ is electrically connected with the sense signal terminal Vsense, the anode of the second photoelectric sensor $D_2$ is electrically connected with the second node N2, the cathode of the second photoelectric sensor $D_2$ is electrically connected with the sense signal terminal Vsense, the anode of the third photoelectric sensor $D_3$ is electrically connected with the third node N3, the cathode of the third photoelectric sensor $D_3$ is electrically connected with the sense signal terminal Vsense, and the anode of the fourth photoelectric sensor $D_4$ is electrically connected with the fourth node N4, the cathode of the fourth photoelectric sensor $D_4$ is electrically connected with the sense signal terminal Vsense.

In an exemplary embodiment, the sense signal terminal sensor may be determined based on photoelectric characteristics of the first photoelectric sensor $D_1$ to the fourth photoelectric sensor $D_4$ and the anode potential of the first photoelectric sensor $D_1$ to the fourth photoelectric sensor $D_4$, ensuring that a working state of the first photoelectric sensor $D_1$ to the fourth photoelectric sensor $D_4$ is in a reverse bias state, which is not limited in this disclosure.

In an exemplary embodiment, the anode of the first photoelectric sensor $D_1$ is electrically connected with the sense signal terminal Vsense, the cathode of the first photoelectric sensor $D_1$ is electrically connected with the first node N1, the anode of the second photoelectric sensor $D_2$ is electrically connected with the sense signal terminal Vsense, the cathode of the second photoelectric sensor $D_2$ is electrically connected with the second node N2, the anode of the third photoelectric sensor $D_3$ is electrically connected with the sense signal terminal Vsense, the cathode of the third photoelectric sensor $D_3$ is electrically connected with the third node N3, and the anode of the fourth photoelectric sensor $D_4$ is electrically connected with the sense signal terminal Vsense, the cathode of the fourth photoelectric sensor $D_4$ is electrically connected with the fourth node N4.

In an exemplary embodiment, the sense signal terminal sensor may be determined based on photoelectric characteristics of the first photoelectric sensor $D_1$ to the fourth photoelectric sensor $D_4$ and the cathode potential of the first photoelectric sensor $D_1$ to the fourth photoelectric sensor $D_4$, ensuring that the working state of the first photoelectric sensor $D_1$ to the fourth photoelectric sensor $D_4$ is in the reverse bias state, which is not limited in this disclosure.

In an exemplary embodiment, as shown in FIG. 2 and FIG. 3, the photoelectric conversion device 100 further includes an element selection circuit and a gear selection circuit; the control signal includes a first element selection signal to a fourth element selection signal and a first gear selection signal to a fourth gear selection signal.

As shown in FIG. 2 and FIG. 3, the element selection circuit is electrically connected with a first element selection signal terminal K1 to a fourth element selection signal terminal K4, the first node N1, the second node N2, the third node N3, the fourth node N4, and the fifth node N5, respectively. The element selection circuit is configured to provide a signal of the first node N1, the second node N2, the third node N3 or the fourth node N4 to the fifth node N5 in a time-sharing manner under a control of the signals from the first element selection signal terminal $K_1$ to the fourth element selection signal terminal $K_4$. The signal of the i-th element selection signal terminal $K_i$ is the i-th element selection signal, and i is ranging from 1 to 4.

As shown in FIG. 2 and FIG. 3, the gear selection circuit is electrically connected with a first gear selection signal terminal $G_1$ to a fourth gear selection signal terminal $G_4$, the fifth node N5, the sixth node N6, the seventh node N7, the eighth node N8, and the ninth node N9. The gear selection circuit is configured to provide a signal of the fifth node N5 to the sixth node N6, the seventh node N7, the eighth node N8, and the ninth node N9 in a time-sharing manner under a control of the signals from the first gear selection signal terminal $G_1$ to the fourth gear selection signal terminal $G_4$. The signal of the i-th gear selection signal terminal $G_i$ is the i-th gear selection signal.

In an exemplary embodiment, as shown in FIG. 2 and FIG. 3, the first element selection signal terminal $K_1$ to the fourth element selection signal terminal $K_4$ and the first gear selection signal terminal $G_1$ to the fourth gear selection signal terminal $G_4$ are electrically connected with the control device 300.

In an exemplary embodiment, when the i-th element selection signal is an effective level signal, all other element selection signals except the i-th element selection signal are dummy level signals, that is, when the first element selection signal is an effective level signal, the second element selection signal to the fourth element selection signal are all dummy level signals. When the second element selection signal is an effective level signal, the first element selection signal, the third element selection signal, and the fourth element selection signal are all dummy level signals. When the third element selection signal is an effective level signal, the first element selection signal, the second element selection signal, and the fourth element selection signal are all dummy level signals. When the fourth element selection signal is an effective level signal, the first element selection signal to the third element selection signal are all dummy level signals.

In an exemplary embodiment, the end time of the i-th element selection signal as an effective level signal is earlier than or equal to the start time of the (i+1)-th element selection signal as an effective level signal, that is, the end time of the first element selection signal as an effective level signal is earlier than or equal to the start time of the second element selection signal as an effective level signal, the end time of the second element selection signal as an effective level signal is earlier than or equal to the start time of the third element selection signal as an effective level signal, and the end time of the third element selection signal as an effective level signal is earlier than or equal to the start time of the fourth element selection signal as an effective level signal.

In an exemplary embodiment, when the i-th gear selection signal is an effective level signal, all other gear selection signals except the i-th gear selection signal are dummy level signals, that is, when the first gear selection signal is an effective level signal, the second gear selection signal to the fourth gear selection signal are all dummy level signals. When the second gear selection signal is an effective level signal, the first gear selection signal, the third gear selection signal, and the fourth gear selection signal are all dummy level signals. When the third gear selection signal is an effective level signal, the first gear selection signal, the second gear selection signal, and the fourth gear selection signal are all dummy level signals. When the fourth gear selection signal is an effective level signal, the first gear selection signal to the third gear selection signal are all dummy level signals.

In an exemplary embodiment, when the i-th element selection signal is an effective level signal, the first gear selection signal to fourth gear selection signal are sequentially the effective level signals, and the duration of the i-th element selection signal being an effective level signal is greater than or equal to the sum of the duration of the first gear selection signal to the fourth gear selection signal being effective level signals.

In an exemplary embodiment, the duration for which the first gear selection signal to the fourth gear selection signal are the effective level signals may be the same or may be different, which is not limited in this disclosure.

In an exemplary embodiment, when an end time at which the i-th element selection signal is an effective level signal is earlier than a start time at which the (i+1)-th element selection signal is an effective level signal, an interval time between an end time at which the i-th element selection signal is an effective level signal and a start time at which the (i+1)-th element selection signal is an effective level signal is equal to a duration for which any one gear selection signal of the first gear selection signal to the fourth gear selection signal is an effective level signal.

As shown in FIG. 3, in an exemplary embodiment, the element selection circuit may include a first element selection sub-circuit to a fourth element selection sub-circuit. Herein, the first element selection sub-circuit is electrically connected with the first element selection signal terminal $K_1$, the first node N1, and the fifth node N5, respectively. The first element selection sub-circuit is configured to provide a signal from the first node N1 to the fifth node N5 under a control of a signal from the first element selection signal terminal $K_1$. The second element selection sub-circuit is electrically connected with the second element selection signal terminal $K_2$, the second node N2, and the fifth node N5, respectively. The second element selection sub-circuit is configured to provide a signal from the second node N2 to the fifth node N5 under a control of a signal from the second element selection signal terminal $K_2$. The third element selection sub-circuit is electrically connected with the third element selection signal terminal $K_3$, the third node N3, and the fifth node N5, respectively. The third element selection sub-circuit is configured to provide a signal from the third node N3 to the fifth node N5 under a control of a signal from the third element selection signal terminal $K_3$. The fourth element selection sub-circuit is electrically connected with the fourth element selection signal terminal $K_4$, the fourth node N4, and the fifth node N5, respectively. The fourth element selection sub-circuit is configured to provide a signal from the fourth node N4 to the fifth node N5 under a control of a signal from the fourth element selection signal terminal $K_4$.

As shown in FIG. 8, the first element selection sub-circuit may include a first element selection transistor $T_{K1}$, the second element selection sub-circuit may include a second element selection transistor $T_{K2}$, the third element selection sub-circuit may include a third element selection transistor $T_{K3}$, and the fourth element selection sub-circuit may include a fourth element selection transistor $T_{K4}$.

As shown in FIG. 8, a control electrode of the first element selection transistor $T_{K1}$ is electrically connected with the first element selection signal terminal $K_1$, a first electrode of the first element selection transistor $T_{K1}$ is electrically connected with the first node N1, and a second electrode of the first element selection transistor $T_{K1}$ is electrically connected with the fifth node N5; a control electrode of the second element selection transistor $T_{K2}$ is electrically connected with the second element selection signal terminal $K_2$, a first electrode of the second element selection transistor $T_{K2}$ is electrically connected with the second node N2, and a second electrode of the second element selection transistor $T_{K2}$ is electrically connected with the fifth node N5; a control electrode of the third element selection transistor $T_{K3}$ is electrically connected with the third element selection signal terminal $K_3$, a first electrode of the third element selection transistor $T_{K3}$ is electrically connected with the third node N3, and a second electrode of the third element selection transistor $T_{K3}$ is electrically connected with the fifth node N5; a control electrode of the fourth element selection transistor $T_{K4}$ is electrically connected with the fourth element selection signal terminal $K_4$, a first electrode of the fourth element selection transistor $T_{K4}$ is electrically connected with the fourth node N4, and a second electrode of the fourth element selection transistor $T_{K4}$ is electrically connected with the fifth node N5.

In an exemplary embodiment, a transistor can be divided into an N-type transistor or a P-type transistor according to its characteristics. When the transistor is a P-type transistor, its turn-on voltage is a low-level voltage (e.g., 0V, −5V, −10V or other suitable voltages) and its turn-off voltage is a high-level voltage (e.g., 5V, 10V or other suitable voltages). When the transistor is an N-type transistor, its turn-on voltage is a high-level voltage (e.g., 5V, 10V or other suitable voltages) and its turn-off voltage is a low-level voltage (e.g., 0V, −5V, −10V or other suitable voltages).

In an exemplary embodiment, the first element selection transistor $T_{K1}$, the second element selection transistor $T_{K2}$, the third element selection transistor $T_{K3}$, and the fourth element selection transistor $T_{K4}$ may be P-type transistors or N-type transistors. The element selection circuit adopts a same type of transistor can simplify the process, reduce the process difficulty, and improve the yield of products.

In an exemplary embodiment, the first element selection transistor $T_{K1}$, the second element selection transistor $T_{K2}$, the third element selection transistor $T_{K3}$, and the fourth element selection transistor $T_{K4}$ may include a P-type transistor and an N-type transistor.

In an exemplary embodiment, the first element selection transistor $T_{K1}$, the second element selection transistor $T_{K2}$, the third element selection transistor $T_{K3}$, and the fourth element selection transistor $T_{K4}$ may adopt low-temperature poly-crystalline silicon thin film transistors, or may adopt oxide thin film transistors, or may adopt low-temperature poly-crystalline silicon thin film transistors and oxide thin film transistors. An active layer of a low temperature poly-crystalline silicon thin film transistor may be made of Low Temperature Poly-Silicon (LTPS for short) and an active layer of an oxide thin film transistor may be made of an oxide semiconductor (Oxide). Low temperature poly-crystalline silicon thin film transistors have the advantages of high mobility and fast charging, oxide thin film transistors have the advantages of low leakage current, and the advantages of both can be utilized to achieve low-frequency drive, reduce power consumption, and improve display quality.

In an exemplary embodiment, the photoelectric conversion device in the present disclosure may be provided with M gear selection sub-circuits, multiple gear selection sub-circuits may accurately detect a current signal, and M is a positive integer greater than or equal to 1. In FIG. 3, illustration is made by taking a case in which M=4, that is, four gear selection sub-circuits as an example.

As shown in FIG. 3, in an exemplary embodiment, the gear selection circuit may include a first gear selection sub-circuit to a fourth gear selection sub-circuit. Herein, the first gear selection sub-circuit is electrically connected with the first gear selection signal terminal $G_1$, the fifth node N5, and the sixth node N6, respectively. The first gear selection sub-circuit is configured to provide a signal from the fifth node N5 to the sixth node N6 under a control of a signal from the first gear selection signal terminal $G_1$. The second gear selection sub-circuit is electrically connected with the second gear selection signal terminal $G_2$, the fifth node N5, and the seventh node N7, respectively. The second gear selection sub-circuit is configured to provide a signal from the fifth node N5 to the seventh node N7 under a control of a signal from the second gear selection signal terminal $G_2$. The third gear selection sub-circuit is electrically connected with the third gear selection signal terminal $G_3$, the fifth node N5, and the eighth node N8, respectively. The third gear selection sub-circuit is configured to provide a signal from the fifth node N5 to the eighth node N8 under a control of a signal from the third gear selection signal terminal $G_3$. The fourth gear selection sub-circuit is electrically connected with the fourth gear selection signal terminal $G_4$, the fifth node N5, and the ninth node N9, respectively. The fourth gear selection sub-circuit is configured to provide a signal from the fifth node N5 to the ninth node N9 under a control of a signal from the fourth gear selection signal terminal $G_4$.

As shown in FIG. 8, the first gear selection sub-circuit may include a first gear selection transistor $T_{G1}$, the second gear selection sub-circuit may include a second gear selection transistor $T_{G2}$, the third gear selection sub-circuit may include a third gear selection transistor $T_{G3}$, and the fourth gear selection sub-circuit may include a fourth gear selection transistor $T_{G4}$.

As shown in FIG. 8, a control electrode of the first gear selection transistor $T_{G1}$ is electrically connected with the first gear selection signal terminal $G_1$, a first electrode of the first gear selection transistor $T_{G1}$ is electrically connected with the fifth node N5, and a second electrode of the first gear selection transistor $T_{G1}$ is electrically connected with the sixth node N6. A control electrode of the second gear selection transistor $T_{G2}$ is electrically connected with the second gear selection signal terminal $G_2$, a first electrode of the second gear selection transistor $T_{G2}$ is electrically connected with the fifth node N5, and a second electrode of the second gear selection transistor $T_{G2}$ is electrically connected with the seventh node N7. A control electrode of the third gear selection transistor $T_{G3}$ is electrically connected with the third gear selection signal terminal $G_3$, a first electrode of the third gear selection transistor $T_{G3}$ is electrically connected with the fifth node N5, and a second electrode of the third gear selection transistor $T_{G3}$ is electrically connected with the eighth node N8. A control electrode of the fourth gear selection transistor $T_{G4}$ is electrically connected with the fourth gear selection signal terminal $G_4$, a first electrode of the fourth gear selection transistor $T_{G4}$ is electrically connected with the fifth node N5, and a second electrode of the fourth gear selection transistor $T_{G4}$ is electrically connected with the ninth node N9.

In an exemplary embodiment, the first gear selection transistor $T_{G1}$, the second gear selection transistor $T_{G2}$, the third gear selection transistor $T_{G3}$, and the fourth gear selection transistor $T_{G4}$ may be P-type transistors or N-type transistors. The element selection circuit adopts a same type of transistor can simplify the process, reduce the process difficulty, and improve the yield of products.

In an exemplary embodiment, the first gear selection transistor $T_{G1}$, the second gear selection transistor $T_{G2}$, the third gear selection transistor $T_{G3}$, and the fourth gear selection transistor $T_{G4}$ may include a P-type transistor and an N-type transistor.

In an exemplary embodiment, the first gear selection transistor $T_{G1}$, the second gear selection transistor $T_{G2}$, the third gear selection transistor $T_{G3}$, and the fourth gear selection transistor $T_{G4}$ may adopt low-temperature poly-crystalline silicon thin film transistors, or may adopt oxide thin film transistors, or may adopt low-temperature poly-crystalline silicon thin film transistors and oxide thin film transistors. An active layer of a low temperature poly-crystalline silicon thin film transistor may be made of Low Temperature Poly-Silicon (LTPS for short) and an active layer of an oxide thin film transistor may be made of an oxide semiconductor (Oxide). Low temperature poly-crystalline silicon thin film transistors have the advantages of high mobility and fast charging, oxide thin film transistors have the advantages of low leakage current, and the advantages of both can be utilized to achieve low-frequency drive, reduce power consumption, and improve display quality.

In an exemplary embodiment, the voltage signals may include a first voltage signal to a fourth voltage signal.

In an exemplary embodiment, the voltage signal is an analog signal.

As shown in FIG. 4 and FIG. 5, in an exemplary embodiment, the current conversion device 200 may include a sample circuit and a filter circuit.

As shown in FIG. 4 and FIG. 5, the sample circuit is electrically connected with the sixth node N6 to the thirteenth node N13 and the reference signal terminal REF, respectively, and the sample circuit is configured to sample the signals of the sixth node N6 to the ninth node N9, generate a first initial voltage signal to a fourth initial voltage signal corresponding to the current signal, and provide the first initial voltage signal to the fourth initial voltage signal corresponding to the current signals to the tenth node N10 to the thirteenth node N13, respectively.

In an exemplary embodiment, the sample circuit may be in a resistive sample mode, in which the current signal forms a voltage drop across a resistor according to Ohm's law, thereby converting the current signal into an initial voltage signal corresponding to the current signal.

As shown in FIG. 4 and FIG. 5, the filter circuit is electrically connected with the tenth node N10 to the thirteenth node N13, the ground terminal GND and the control device 300, respectively. The filter circuit is configured to filter the first initial voltage signal to the fourth initial voltage signal corresponding to the current signal, generate a first voltage signal to a fourth voltage signal corresponding to the current signal, and provide the first voltage signal to the fourth voltage signal corresponding to the current signals to the control device 300, respectively.

In an exemplary embodiment, the filter circuit mainly eliminates high frequency noise on the first initial voltage signal to the fourth initial voltage signal corresponding to the current signal.

In an exemplary embodiment, the signals of the sixth node N6 to the ninth node N9 are current signals.

As shown in FIG. 5 in an exemplary embodiment, the sample circuit may include a first sample sub-circuit, a second sample sub-circuit, a third sample sub-circuit, and a fourth sample sub-circuit. Herein, the first sample sub-circuit is electrically connected with the sixth node N6, the tenth node N10, and the reference signal terminal REF respectively, and the first sample sub-circuit is configured to sample a signal of the sixth node N6, generate the first initial voltage signal corresponding to the current signals, and provide the first initial voltage signal corresponding to the current signals to the tenth node N10; the second sample sub-circuit is electrically connected with the seventh node N7, the eleventh node N11, and the reference signal terminal REF respectively, and the second sample sub-circuit is configured to sample a signal of the seventh node N7, generate the second initial voltage signal corresponding to the current signals, and provide the second initial voltage signal corresponding to the current signals to the eleventh node N11; the third sample sub-circuit is electrically connected with the eighth node N8, the twelfth node N12, and the reference signal terminal REF respectively, and the third sample sub-circuit is configured to sample a signal of the eighth node N8, generate the third initial voltage signal corresponding to the current signals, and provide the third initial voltage signal corresponding to the current signals to the twelfth node N12; the fourth sample sub-circuit is electrically connected with the ninth node N9, the thirteenth node N13, and the reference signal terminal REF respectively, and the fourth sample sub-circuit is configured to sample a signal of the ninth node N9, generate the fourth initial voltage signal corresponding to the current signal, and provide the fourth initial voltage signal corresponding to the current signals to the thirteenth node N13.

As shown in FIG. 8, in an exemplary embodiment, the first sample sub-circuit may include a first operational amplifier $OP_1$, a first sample resistor $SR_1$, and a first feedback capacitor $FC_1$; the second sample sub-circuit may include a second operational amplifier $OP_2$, a second sample resistor $SR_2$, and a second feedback capacitor $FC_2$; the third sample sub-circuit may include a third operational amplifier $OP_3$, a third sample resistor $SR_3$, and a third feedback capacitor $FC_3$; the fourth sample sub-circuit may include a fourth operational amplifier $OP_4$, a fourth sample resistor $SR_4$, and a fourth feedback capacitor $FC_4$.

As shown in FIG. 8, a non-inverting input terminal of the first operational amplifier $OP_1$ is electrically connected with the reference signal terminal REF, an inverting input terminal of the first operational amplifier $OP_1$ is electrically connected with the sixth node N6, and an output terminal of the first operational amplifier $OP_1$ is electrically connected with the tenth node N10; a first electrode of the first sample resistor $SR_1$ is electrically connected with the sixth node N6 and a second electrode of the first sample resistor $SR_1$ is electrically connected with tenth node N10; a first electrode of the first feedback capacitor $FC_1$ is electrically connected with the sixth node N6 and a second electrode of the first feedback capacitor $FC_1$ is electrically connected with the tenth node N10; a non-inverting input terminal of the second operational amplifier $OP_2$ is electrically connected with the reference signal terminal REF, an inverting input terminal of the second operational amplifier $OP_2$ is electrically connected with the seventh node N7, and an output terminal of the second operational amplifier $OP_2$ is electrically connected with the eleventh node N11; a first electrode of the second sample resistor $SR_2$ is electrically connected with the seventh node N7 and a second electrode of the second sample resistor $SR_2$ is electrically connected with eleventh node N11; a first electrode of the second feedback capacitor $FC_2$ is electrically connected with the seventh node N7 and a second electrode of the second feedback capacitor $FC_2$ is electrically connected with the eleventh node N11; a non-inverting input terminal of the third operational amplifier $OP_3$ is electrically connected with the reference signal terminal REF, an inverting input terminal of the third operational amplifier $OP_3$ is electrically connected with the eighth node N8, and an output terminal of the third operational amplifier $OP_3$ is electrically connected with the twelfth node N12; a first electrode of the third sample resistor $SR_3$ is electrically connected with the eighth node N8 and a second electrode of the third sample resistor $SR_3$ is electrically connected with twelfth node N12; a first electrode of the third feedback capacitor $FC_3$ is electrically connected with the eighth node N8 and a second electrode of the third feedback capacitor $FC_3$ is electrically connected with the twelfth node N12; a non-inverting input terminal of the fourth operational amplifier $OP_4$ is electrically connected with the reference signal terminal REF, an inverting input terminal of the fourth operational amplifier $OP_4$ is electrically connected with the ninth node N9, and an output terminal of the fourth operational amplifier $OP_4$ is electrically connected with the thirteenth node N13; a first electrode of the fourth sample resistor $SR_4$ is electrically connected with the ninth node N9 and a second electrode of the fourth sample resistor $SR_4$ is electrically connected with thirteenth node N13; a first electrode of the fourth feedback capacitor $FC_4$ is electrically connected with the ninth node N9 and a second electrode of the fourth feedback capacitor $FC_4$ is electrically connected with the thirteenth node N13.

In an exemplary embodiment, the resistance of the first sample resistor is R1, the resistance of the second sample resistor is R2, the resistance of the third sample resistor is R3, and the resistance of the fourth sample resistor is R4. When an amplification factor of the fourth sample sub-circuit is 1, an amplification factor of the first sample sub-circuit is R1/R4; an amplification factor of the second sample sub-circuit is R2/R4; an amplification factor of the third sample sub-circuit is R3/R4.

In order to conveniently calculate the amplification factor from the current signal to the voltage signal of the sample circuit, the resistance R1 of the first sample resistor, the resistance R2 of the second sample resistor, the resistance R3 of the third sample resistor and the resistance R4 of the fourth sample resistor in the present disclosure satisfy: R1=K×R2=K$^2$×R3=K$^3$×R4, K is a positive integer greater than 1. At this time, the amplification factor of the first sample sub-circuit is K$^3$, the amplification factor of the second sample sub-circuit is K$^2$, the amplification factor of the third sample sub-circuit is K.

In an exemplary embodiment, M may be equal to 10.

In an exemplary embodiment, when cathodes of the first photoelectric sensor to the fourth photoelectric sensor are connected with the sense signal terminal, and anodes of the first photoelectric sensor to the fourth photoelectric sensor are connected with the element selection circuit, a current signal flows from the photoelectric diode to the element selection circuit, and the voltage value Vi of the i-th voltage signal corresponding to the current signals meets the following condition: Vi=Vref−I×Ri. Where Vref is a voltage value of the signal at the reference signal terminal REF, i is a current value of the current signal, and Ri is a resistance of the i-th sample resistor. When sampling, a voltage value of the anode of the photoelectric sensor can be Vref, at this time, a reverse bias voltage of the photoelectric sensor is Vsense−Vref, Vsense>Vref, where Vsense is a voltage value of the sense signal terminal.

When the anodes of the first photoelectric sensor to the fourth photoelectric sensor are connected with the sense signal terminal Vsense, and the cathodes of the first photoelectric sensor to the fourth photoelectric sensor are connected with the element selection circuit, a current signal flows to the photoelectric diode from the element selection circuit, and the voltage value Vi of the i-th voltage signal corresponding to the current signals meets the following conditions: Vi=Vref+I×Ri. When sampling, a voltage value of the cathode of the photoelectric sensor can be Vref, at this time, a reverse bias voltage of the photoelectric sensor is Vref−Vsense, and Vsense<Vref.

In an exemplary embodiment, a current value of a leakage current of the first operational amplifier OP$_1$ to the fourth operational amplifier OP$_4$ is less than or equal to one tenth of the current signal. Since a current value of the current signal converted by the photoelectric sensor is particularly small, the smaller the current value of the leakage current of the first operational amplifier OP$_1$ to the fourth operational amplifier OP$_4$, the smaller the influence on the current signal, and the higher the sample accuracy.

As shown in FIG. 5, in an exemplary embodiment, the filter circuit may include a first filter sub-circuit, a second filter sub-circuit, a third filter sub-circuit, and a fourth filter sub-circuit. Herein, the first filter sub-circuit is electrically connected with the tenth node N10, the ground terminal GND and the control device 300, respectively, and the first filter sub-circuit is configured to filter the signal of the tenth node N10. After filtering out the high-frequency signal in the first initial voltage signal, the first voltage signal corresponding to the current signals is generated, and the first voltage signal corresponding to the current signals is provided to the control device 300. The second filter sub-circuit is electrically connected with the eleventh node N11, the ground terminal GND and the control device 300, respectively, and the second filter sub-circuit is configured to filter the signal of the eleventh node N10. After filtering out the high-frequency signal in the second initial voltage signal, the second voltage signal corresponding to the current signals is generated, and the second voltage signal corresponding to the current signals is provided to the control device 300. The third filter sub-circuit is electrically connected with the twelfth node N12, the ground terminal GND and the control device 300, respectively, and the third filter sub-circuit is configured to filter the signal of the twelfth node N12. After filtering out the high-frequency signal in the third initial voltage signal, the third voltage signal corresponding to the current signals is generated, and the third voltage signal corresponding to the current signals is provided to the control device 300. The fourth filter sub-circuit is electrically connected with the thirteenth node N13, the ground terminal GND and the control device 300, respectively, and the fourth filter sub-circuit is configured to filter the signal of the thirteenth node N13. After filtering out the high-frequency signal in the fourth initial voltage signal, the fourth voltage signal corresponding to the current signals is generated, and the fourth voltage signal corresponding to the current signals is provided to the control device 300.

As shown in FIG. 8, in an exemplary embodiment, the first filter sub-circuit includes a first filter resistor LR$_1$ and a first filter capacitor LC$_1$; the second filter sub-circuit includes a second filter resistor LR$_2$ and a second filter capacitor LC$_2$; the third filter sub-circuit includes a third filter resistor LR$_3$ and a third filter capacitor LC$_3$; the fourth filter sub-circuit includes a fourth filter resistor LR$_4$ and a fourth filter capacitor LC$_4$.

As shown in FIG. 8, a first terminal of the first filter resistor LR$_1$ is electrically connected with the tenth node N10 and a second terminal of the first filter resistor LR$_1$ is electrically connected with the control device 300 and a first terminal of the first filter capacitor LC$_1$, respectively, and a second terminal of the first filter capacitor LC$_1$ is electrically connected with the ground terminal GND; a first terminal of the second filter resistor LR$_2$ is electrically connected with the eleventh node N11 and a second terminal of the second filter resistor LR$_2$ is electrically connected with the control device 300 and a first terminal of the second filter capacitor LC$_2$, respectively, and a second terminal of the second filter capacitor LC$_2$ is electrically connected with the ground terminal GND; a first terminal of the third filter resistor LR$_3$ is electrically connected with the twelfth node N12 and a second terminal of the third filter resistor LR$_3$ is electrically connected with the control device 300 and a first terminal of the third filter capacitor LC$_3$, respectively, and a second terminal of the third filter capacitor LC$_3$ is electrically connected with the ground terminal GND; a first terminal of the fourth filter resistor LR$_4$ is electrically connected with the thirteenth node N13 and a second terminal of the fourth filter resistor LR$_4$ is electrically connected with the control device 300 and a first terminal of the fourth filter capacitor LC$_4$, respectively, and a second terminal of the fourth filter capacitor LC$_4$ is electrically connected with the ground terminal GND.

As shown in FIG. 6 to FIG. 8, in an exemplary embodiment, the control device 300 may include an analog-to-digital conversion element 310, a controller 320, and a level converter 330. Herein, the analog-to-digital conversion element 310 is electrically connected with the filter circuit and is configured to convert the first voltage signal to the fourth voltage signal corresponding to the current signals into the first digital voltage signal to the fourth digital voltage signal corresponding to the current signal; the controller 320 is electrically connected with the analog-to-digital conversion element 310 and is configured to generate the first initial element selection signal to the fourth initial element selection signal and the first initial gear selection signal to the fourth initial gear selection signal, and generates the chromaticity parameters of the light according to the first digital voltage signal to the fourth digital voltage signal corresponding to the current signal; the level converter 330 is electrically connected with the controller 320, the first element selection signal terminal $K_1$ to the fourth element selection signal terminal $K_4$ and a first gear selection signal terminal $G_1$ to the fourth gear selection signal terminal $G_4$; the level converter 330 is configured to perform level conversion for the first initial element selection signal $KM_1$ to the fourth initial element selection signal $KM_4$, generate the first element selection signal to the fourth element selection signal, and provide the first element selection signal to the fourth element selection signal to the first element selection signal terminal $K_1$ to the fourth element selection signal terminal $K_4$, respectively; the level converter 330 is configured to perform level conversion for the first initial gear selection signal $GM_1$ to the fourth initial gear selection signal $GM_4$, generate the first gear selection signal to the fourth gear selection signal, and provide the first gear selection signal to the fourth gear selection signal to the first gear selection signal terminal $G_1$ to the fourth gear selection signal terminal $K_4$, respectively.

As shown in FIG. 7 and FIG. 8, in an exemplary embodiment, the analog-to-digital conversion element 310 includes a signal selector 311, a signal buffer 312, and an analog-to-digital converter 313. Herein, the signal selector 311 is electrically connected to the filter circuit and the signal buffer 312 in the current conversion device, respectively, and is configured to transmit the first voltage signal to the fourth voltage signal corresponding to the current signals to the signal buffer 312 in a time-sharing manner; the signal buffer 312 is configured to store a first voltage signal to a fourth voltage signal corresponding to a time-sharing input current signal of the signal selector; the analog-to-digital converter 313 is electrically connected with the signal buffer 312, and is configured to convert the first voltage signal to the fourth voltage signal corresponding to the current signals in the signal buffer into the first digital voltage signal to the fourth digital voltage signal corresponding to the current signals in a time-sharing manner.

In an exemplary embodiment, in order to ensure an accuracy of light detection, the analog-to-digital converter 313 must complete the analog-to-digital conversion before the next voltage signal is written to the signal buffer 312, and write a converted digital signal to a register of the analog-to-digital converter.

In an exemplary embodiment, the analog-to-digital converter may include a linear transfer function of a voltage signal to a digital voltage signal such that the voltage signal and the digital voltage signal to which the voltage signal is converted are in a one-to-one correspondence.

In an exemplary embodiment, the transfer function of the analog-to-digital conversion element is linear, and the linear function may be $VDi=Vi/VrefADC \times 2^n+offset$, VDi is a voltage value of the i-th digital voltage signal, Vi is the voltage value of an i-th voltage signal, n is the number of bits of the analog-to-digital conversion, and VrefADC is a maximum input voltage value of the analog-to-digital converter.

In an exemplary embodiment, a number of bits n of the analog-to-digital conversion may be 16 bits, i.e., 16 bits. When an input voltage signal is VrefADC, an output digital voltage signal is $2^{16}=65536$ LSB.

In an exemplary embodiment, the resistance R4 of the fourth sample resistor may be determined according to the current signal into which the photoelectric conversion element converts the light of the maximum brightness and the input voltage range of the analog-to-digital converter, which is not limited by the present disclosure. The input voltage range of the analog-to-digital converter may include a maximum input voltage value and a minimum input voltage value.

In an exemplary embodiment, the maximum input voltage value may be 2V and the minimum input voltage value may be 0V.

Generally, the analog-to-digital converter has a good linear transfer function in the voltage range of 0.2 V~VrefADC−0.2.

In an exemplary embodiment, a voltage value of the signal at the reference signal terminal REF is constant, and the voltage value of the signal at the reference signal terminal REF is less than the maximum input voltage value of the analog-to-digital converter 313 and greater than the minimum input voltage value of the analog-to-digital converter, and the difference between the maximum input voltage value of the analog-to-digital converter 313 and the voltage value of the signal at the reference signal terminal is a threshold difference value.

In an exemplary embodiment, the threshold difference may be about 0.1 volts to 0.3 volts, and, exemplarily, the threshold difference may be 0.2 volts.

In an exemplary embodiment, as shown in FIG. 7 and FIG. 8, the controller 320 includes eight interfaces P1 to P8, the interfaces are configured as standard general purpose input and output ports. Herein, eight first interfaces are electrically connected with the level converter 330 and are configured to transmit the first initial element selection signal to the fourth initial element selection signal and the first initial gear selection signal to the fourth initial gear selection signal to the level converter 330, respectively.

In an exemplary embodiment, the controller 320 may further include a first digital register to a fourth digital register.

In an exemplary embodiment, the controller 320 may be configured to pre-store the first threshold voltage value and the second threshold voltage value, sequentially judge whether the voltage values of the first digital voltage signal to the fourth digital voltage signal corresponding to the i-th current signal meet the corresponding threshold condition, convert the digital voltage signal corresponding to the i-th current signal to the full-range digital voltage signal, and store the converted full-range digital voltage signal in the i-th digital register, and further configured to generate the chromaticity parameters of the light according to the full-range digital voltage signal from the first digital register to the fourth digital register.

In an exemplary embodiment, the controller may also be configured to discard the digital voltage signal corresponding to the i-th current signal that does not meet the corresponding threshold condition.

In an exemplary embodiment, according to the maximum leakage current and minimum leakage current generated under illumination of the ambient light sensor and the sample resistance, it is determined that only the digital signal collected by one gear of the sample voltage is within the collected effective data, and the data of other gears are greater than the maximum digital threshold or less than the lowest digital threshold. The data that is not within the threshold range indicates that the gear selection is inappropriate and the collected data is discarded.

In an exemplary embodiment, a threshold condition corresponding to a first digital voltage signal corresponding to an i-th current signal is greater than a second threshold voltage value, a threshold condition corresponding to a second digital voltage signal and a third digital voltage signal corresponding to an i-th current signal is greater than the first threshold voltage value and less than the second threshold voltage value, and a threshold condition corresponding to a fourth digital voltage signal corresponding to an i-th current signal is less than the first threshold voltage value.

In an exemplary embodiment, the first threshold voltage value may be greater than the minimum input voltage value of the analog-to-digital converter and the second threshold voltage value may be less than the maximum input voltage value of the mode converter. Herein, the difference between the first threshold voltage value and the minimum input voltage value of the analog-to-digital converter is equal to the difference between the maximum output voltage value of the analog-to-digital converter and the second threshold voltage value.

In an exemplary embodiment, the difference between the first threshold voltage value and the minimum input voltage value of the analog-to-digital converter may be 0.1 V to 0.3 V, and exemplarily may be 0.2 V.

In an exemplary embodiment, the first threshold voltage value may be a minimum input voltage value of the analog-to-digital converter plus 0.2 V, i.e., 0V+0.2 V, and the second threshold voltage value may be a maximum input voltage value of the analog-to-digital converter minus 0.2 V.

In an exemplary embodiment, when $R1=K \times R2=K^2 \times R3=K^3 \times R4$ is satisfied in the sample circuit, the controller 320 may be configured according to the formula $V_{Dcount}=V_{Dj}/Gain_j$. The j-th digital voltage signal is converted into a full-range digital voltage signal Dcount, wherein the j-th digital voltage signal is a digital voltage signal corresponding to the i-th current signal meeting a threshold condition, Gain is an amplification factor, $Gain_j=K^j$, $V_{Dcount}$ is the voltage value of the full-range digital voltage signal, $V_{Dj}$ is the voltage value of the j-th digital voltage signal, j=1, 2, 3 or 4.

In an exemplary embodiment, the control device 300 may further include a transmission interface 340 connected with the controller 320, the transmission interface 340 is configured as a serial interface and configured to transmit a chromaticity parameter LS of the light generated by the controller 320.

In an exemplary embodiment, the transmission interface 340 may include I²C interface or SPI interface.

In an exemplary embodiment, I²C interface includes a two-way data line SDA and a clock line SCL.

Figure 9:
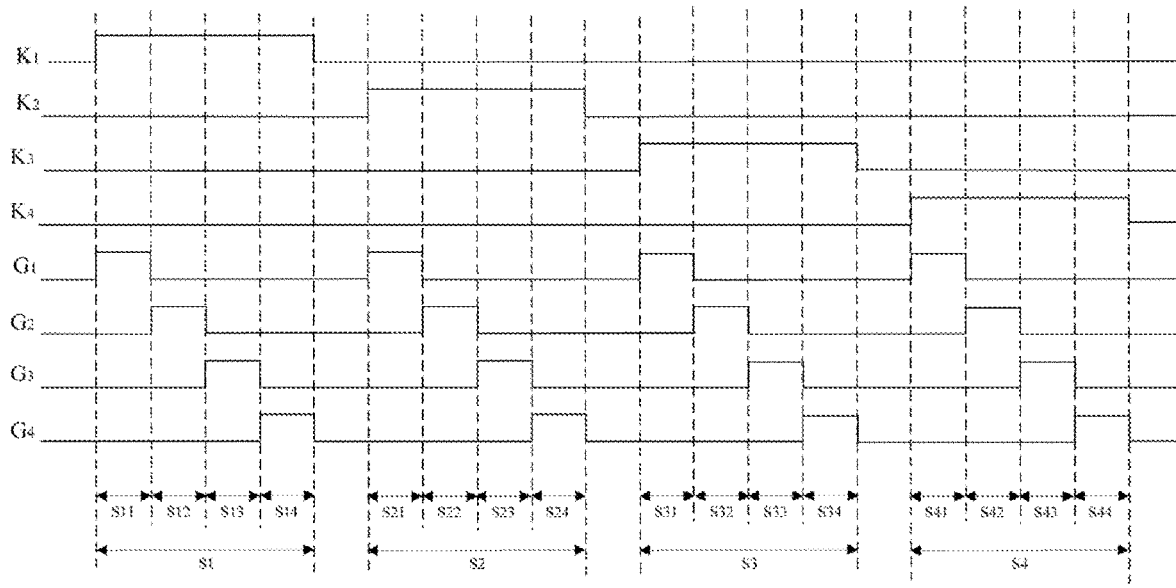
FIG. 9 is a working sequence diagram of a control signal.

FIG. 9 is a working sequence diagram of a control signal. The working process of the light detection structure shown in FIG. 8 below illustrates the light detection structure provided in an exemplary embodiment of the present disclosure. In FIG. 9, illustration is made by taking a case in which all transistors in the light detection structure are N-type transistors as an example. As shown in FIG. 9, the working process of the light detection structure may include a first sample stage S1 to a fourth sample stage S4, the number of the first sample stage S1 to the fourth sample stage S4 may be N, the m-th first sample stage S1 to the m-th fourth sample stage S4 occur sequentially, and the m-th first sample stage occurs after the (m−1)-st fourth sample stage. As shown in FIG. 9, the first color sample stage S1 includes a first gear selection stage S11 to a fourth gear selection stage S14, the second color sample stage S2 includes a first gear selection stage S21 to a fourth gear selection stage S24, the third color sample stage S3 includes a first gear selection stage S31 to a fourth gear selection stage S34, and the fourth color sample stage S4 includes a first gear selection stage S41 to a fourth gear selection stage S44.

At the first gear selection stage S11 of the first color sample stage S1, a first photoelectric sensor $D_1$ converts the light of a first color into a first current signal and writes it into the first node N1; a signal of the first element selection signal terminal $K_1$ is a high-level signal, the first element selection transistor $T_{K1}$ is turned on, a signal of the first node N1 is written into the fifth node N5, a signal of the first gear selection signal terminal $G_1$ is a high-level signal, the first gear selection transistor $T_{G1}$ is turned on, a signal of the fifth node N5 is written to the sixth node N6, a first sample sub-circuit samples the first current signal to generate the first initial voltage signal corresponding to the first current signal, the first filter sub-circuit filters the first initial voltage signal corresponding to the first current signal to generate the first voltage signal corresponding to the first current signal, the signal selector transmits the first voltage signal corresponding to the first current signal to the signal buffer, the signal buffer stores the first voltage signal corresponding to the first current signal, the analog-to-digital converter converts the first voltage signal corresponding to the first current signal into the first digital voltage signal corresponding to the first current signal, the controller determines whether the first digital voltage signal corresponding to the first current signal meets the threshold condition, that is, a voltage value of the first digital voltage signal is greater than the second threshold voltage value, when the first digital voltage signal corresponding to the first current signal meets the threshold condition, the first digital voltage signal corresponding to the first current signal is converted into a full-range digital voltage signal, and the converted full-range digital voltage signal is saved in the first digital register, when the voltage value of the first digital voltage signal corresponding to the first current signal does not meet the threshold condition, that is the voltage value of the first digital voltage signal is less than the second threshold voltage value, the first digital voltage signal corresponding to the first current signal is discarded.

At the second gear selection stage S12 of the first color sample stage S1, the first photoelectric sensor $D_1$ converts the light of the first color into the first current signal and writes it into the first node N1; the signal of the first element selection signal terminal $K_1$ is the high-level signal, the first element selection transistor $T_{K1}$ is turned on, the signal of the first node N1 is written into the fifth node N5, a signal of the second gear selection signal terminal $G_2$ is a high-level signal, the second gear selection transistor $T_{G2}$ is turned on, a signal of the fifth node N5 is written to the seventh node N7, a second sample sub-circuit samples the first current signal to generate the second initial voltage signal corresponding to the first current signal, the second filter sub-circuit filters the second initial voltage signal corresponding to the first current signal to generate the second voltage signal corresponding to the first current signal, the signal selector transmits the second voltage signal corresponding to the first current signal to the signal buffer, the signal buffer stores the second voltage signal corresponding to the first current signal, the analog-to-digital converter converts the second voltage signal corresponding to the first current signal into the second digital voltage signal corresponding to the first current signal, the controller determines whether the second digital voltage signal corresponding to the first current signal meets the threshold condition, when the second digital voltage signal corresponding to the first current signal meets the threshold condition, that is a voltage value of the second digital voltage signal is greater than the first threshold voltage value and less than the second threshold voltage value, the second digital voltage signal corresponding to the first current signal is converted into a full-range digital voltage signal, and the converted full-range digital voltage signal is saved in the first digital register, when the voltage value of the second digital voltage signal corresponding to the first current signal does not meet the threshold condition, that is the voltage value of the second digital voltage signal is less than the first threshold voltage value or greater than the second threshold voltage value, the second digital voltage signal corresponding to the first current signal is discarded.

At the third gear selection stage S13 of the first color sample stage S1, the first photoelectric sensor $D_1$ converts the light of the first color into the first current signal and writes it into the first node N1; the signal of the first element selection signal terminal $K_1$ is the high-level signal, the first element selection transistor $T_{K1}$ is turned on, the signal of the first node N1 is written into the fifth node N5, a signal of the third gear selection signal terminal $G_3$ is a high-level signal, the third gear selection transistor $T_{G3}$ is turned on, a signal of the fifth node N5 is written to the eighth node N8, a third sample sub-circuit samples the first current signal to generate the third initial voltage signal corresponding to the first current signal, the third filter sub-circuit filters the third initial voltage signal corresponding to the first current signal to generate the third voltage signal corresponding to the first current signal, the signal selector transmits the third voltage signal corresponding to the first current signal to the signal buffer, the signal buffer stores the third voltage signal corresponding to the first current signal, the analog-to-digital converter converts the third voltage signal corresponding to the first current signal into the third digital voltage signal corresponding to the first current signal, the controller determines whether the third digital voltage signal corresponding to the first current signal meets the threshold condition, when the third digital voltage signal corresponding to the first current signal meets the threshold condition, that is a voltage value of the third digital voltage signal is greater than the first threshold voltage value and less than the second threshold voltage value, the third digital voltage signal corresponding to the first current signal is converted into a full-range digital voltage signal, and the converted full-range digital voltage signal is saved in the first digital register, when the voltage value of the third digital voltage signal corresponding to the first current signal does not meet the threshold condition, that is the voltage value of the third digital voltage signal is less than the first threshold voltage value or greater than the second threshold voltage value, the third digital voltage signal corresponding to the first current signal is discarded.

At the fourth gear selection stage S14 of the first color sample stage S1, the first photoelectric sensor $D_1$ converts the light of the first color into the first current signal and writes it into the first node N1; the signal of the first element selection signal terminal $K_1$ is the high-level signal, the first element selection transistor $T_{K1}$ is turned on, the signal of the first node N1 is written into the fifth node N5, a signal of the fourth gear selection signal terminal $G_4$ is a high-level signal, the fourth gear selection transistor $T_{G4}$ is turned on, a signal of the fifth node N5 is written to the ninth node N9, a fourth sample sub-circuit samples the first current signal to generate the fourth initial voltage signal corresponding to the first current signal, the fourth filter sub-circuit filters the fourth initial voltage signal corresponding to the first current signal to generate the fourth voltage signal corresponding to the first current signal, the signal selector transmits the fourth voltage signal corresponding to the first current signal to the signal buffer, the signal buffer stores the fourth voltage signal corresponding to the first current signal, the analog-to-digital converter converts the fourth voltage signal corresponding to the first current signal into the fourth digital voltage signal corresponding to the first current signal, the controller determines whether the third digital voltage signal corresponding to the first current signal meets the threshold condition, when the fourth digital voltage signal corresponding to the first current signal meets the threshold condition, that is a voltage value of the third digital voltage signal is less than the first threshold voltage value, the fourth digital voltage signal corresponding to the first current signal is converted into a full-range digital voltage signal, and the converted full-range digital voltage signal is saved in the first digital register, when the voltage value of the fourth digital voltage signal corresponding to the first current signal does not meet the threshold condition, that is the voltage value of the fourth digital voltage signal is greater than the first threshold voltage value, the fourth digital voltage signal corresponding to the first current signal is discarded.

There is a blank stage between the first color sample stage and the second color sample stage, at the blank stage, all control signals are low-level signals, all transistors are turned off, and no sampling is carried out.

The controller determines whether the voltage values of the first digital voltage signal to the fourth digital voltage signal corresponding to the second current signal meet the threshold condition when the first current signal is not the fourth current signal, if yes, executes the second color sample stage.

At the first gear selection stage S21 of the second color sample stage S2, a second photoelectric sensor $D_2$ converts the light of a second color into a second current signal and writes it into the second node N2; a signal of the second element selection signal terminal $K_2$ is a high-level signal, the second element selection transistor $T_{K2}$ is turned on, the signal of the second node N2 is written into the fifth node N5, the signal of the first gear selection signal terminal $G_1$ is a high-level signal, the first gear selection transistor $T_{G1}$ is turned on, a signal of the fifth node N5 is written to the sixth node N6, a first sample sub-circuit samples the second current signal to generate the first initial voltage signal corresponding to the second current signal, the first filter sub-circuit filters the first initial voltage signal corresponding to the second current signal to generate the first voltage signal corresponding to the second current signal, the signal selector transmits the first voltage signal corresponding to the second current signal to the signal buffer, the signal buffer stores the first voltage signal corresponding to the second current signal, the analog-to-digital converter converts the first voltage signal corresponding to the second current signal into the first digital voltage signal corresponding to the second current signal, the controller determines whether the first digital voltage signal corresponding to the second current signal meets the threshold condition, when the first digital voltage signal corresponding to the second current signal meets the threshold condition, that is the voltage value of the first digital voltage signal is greater than the second threshold voltage value, the first digital voltage signal corresponding to the second current signal is converted into a full-range digital voltage signal, and the converted full-range digital voltage signal is saved in the second digital register, when the voltage value of the first digital voltage signal corresponding to the second current signal does not meet the threshold condition, that is the voltage value of the first digital voltage signal is less than the second threshold voltage value, the first digital voltage signal corresponding to the second current signal is discarded.

At the second gear selection stage S22 of the second color sample stage S2, the second photoelectric sensor $D_2$ converts the light of the second color into the second current signal and writes it into the second node N2; the signal of the second element selection signal terminal $K_2$ is the high-level signal, the second element selection transistor $T_{K2}$ is turned on, the signal of the second node N2 is written into the fifth node N5, the signal of the second gear selection signal terminal $G_2$ is a high-level signal, the second gear selection transistor $T_{G2}$ is turned on, the signal of the fifth node N5 is written to the seventh node N7, the second sample sub-circuit samples the second current signal to generate the second initial voltage signal corresponding to the second current signal, the second filter sub-circuit filters the second initial voltage signal corresponding to the second current signal to generate the second voltage signal corresponding to the second current signal, the signal selector transmits the second voltage signal corresponding to the second current signal to the signal buffer, the signal buffer stores the second voltage signal corresponding to the second current signal, the analog-to-digital converter converts the second voltage signal corresponding to the second current signal into the second digital voltage signal corresponding to the second current signal, the controller determines whether the second digital voltage signal corresponding to the second current signal meets the threshold condition, when the second digital voltage signal corresponding to the second current signal meets the threshold condition, that is the voltage value of the second digital voltage signal is greater than the first threshold voltage value and less than the second threshold voltage value, the second digital voltage signal corresponding to the second current signal is converted into a full-range digital voltage signal, and the converted full-range digital voltage signal is saved in the second digital register, when the voltage value of the second digital voltage signal corresponding to the second current signal does not meet the threshold condition, that is the voltage value of the second digital voltage signal is less than the first threshold voltage value or greater than the second threshold voltage value, the second digital voltage signal corresponding to the second current signal is discarded.

At the third gear selection stage S23 of the second color sample stage S2, the second photoelectric sensor $D_2$ converts the light of the second color into the second current signal and writes it into the second node N2; the signal of the second element selection signal terminal $K_2$ is the high-level signal, the second element selection transistor $T_{K2}$ is turned on, the signal of the second node N2 is written into the fifth node N5, the signal of the third gear selection signal terminal $G_3$ is a high-level signal, the third gear selection transistor $T_{G3}$ is turned on, the signal of the fifth node N5 is written to the eighth node N8, the third sample sub-circuit samples the second current signal to generate the third initial voltage signal corresponding to the second current signal, the third filter sub-circuit filters the third initial voltage signal corresponding to the second current signal to generate the third voltage signal corresponding to the second current signal, the signal selector transmits the third voltage signal corresponding to the second current signal to the signal buffer, the signal buffer stores the third voltage signal corresponding to the second current signal, the analog-to-digital converter converts the third voltage signal corresponding to the second current signal into the third digital voltage signal corresponding to the second current signal, the controller determines whether the third digital voltage signal corresponding to the second current signal meets the threshold condition, when the third digital voltage signal corresponding to the second current signal meets the threshold condition, that is the voltage value of the third digital voltage signal is greater than the first threshold voltage value and less than the second threshold voltage value, the third digital voltage signal corresponding to the second current signal is converted into a full-range digital voltage signal, and the converted full-range digital voltage signal is saved in the second digital register, when the voltage value of the third digital voltage signal corresponding to the second current signal does not meet the threshold condition, that is the voltage value of the third digital voltage signal is less than the first threshold voltage value or greater than the second threshold voltage value, the third digital voltage signal corresponding to the second current signal is discarded.

At the fourth gear selection stage S24 of the second color sample stage S2, the second photoelectric sensor $D_2$ converts the light of the second color into the second current signal and writes it into the second node N2; the signal of the second element selection signal terminal $K_2$ is the high-level signal, the second element selection transistor $T_{K2}$ is turned on, the signal of the second node N2 is written into the fifth node N5, the signal of the fourth gear selection signal terminal $G_4$ is a high-level signal, the fourth gear selection transistor $T_{G4}$ is turned on, the signal of the fifth node N5 is written to the ninth node N9, the fourth sample sub-circuit samples the second current signal to generate the fourth initial voltage signal corresponding to the second current signal, the fourth filter sub-circuit filters the fourth initial voltage signal corresponding to the second current signal to generate the fourth voltage signal corresponding to the second current signal, the signal selector transmits the fourth voltage signal corresponding to the second current signal to the signal buffer, the signal buffer stores the fourth voltage signal corresponding to the second current signal, the analog-to-digital converter converts the fourth voltage signal corresponding to the second current signal into the fourth digital voltage signal corresponding to the second current signal, the controller determines whether the fourth digital voltage signal corresponding to the second current signal meets the threshold condition, when the fourth digital voltage signal corresponding to the second current signal meets the threshold condition, that is the voltage value of the third digital voltage signal is less than the first threshold voltage value, the fourth digital voltage signal corresponding to the second current signal is converted into a full-range digital voltage signal, and the converted full-range digital voltage signal is saved in the second digital register, when the voltage value of the fourth digital voltage signal corresponding to the second current signal does not meet the threshold condition, that is the voltage value of the fourth digital voltage signal is greater than the first threshold voltage value, the fourth digital voltage signal corresponding to the second current signal is discarded.

There is a blank stage between the second color sample stage and the third color sample stage, at the blank stage, all control signals are low-level signals, all transistors are turned off, and no sampling is carried out.

The controller determines whether the voltage values of the first digital voltage signal to the fourth digital voltage signal corresponding to the third current signal meet the threshold condition when the second current signal is not the fourth current signal, if yes, executes the third color sample stage.

At the first gear selection stage S31 of the third color sample stage S3, a third photoelectric sensor $D_3$ converts the light of a third color into a third current signal and writes it into the third node N3; a signal of the third element selection signal terminal $K_3$ is a high-level signal, the third element selection transistor $T_{K3}$ is turned on, the signal of the third node N3 is written into the fifth node N5, the signal of the first gear selection signal terminal $G_1$ is a high-level signal, the first gear selection transistor $T_{G1}$ is turned on, a signal of the fifth node N5 is written to the sixth node N6, a first sample sub-circuit samples the third current signal to generate the first initial voltage signal corresponding to the third current signal, the first filter sub-circuit filters the first initial voltage signal corresponding to the third current signal to generate the first voltage signal corresponding to the third current signal, the signal selector transmits the first voltage signal corresponding to the third current signal to the signal buffer, the signal buffer stores the first voltage signal corresponding to the third current signal, the analog-to-digital converter converts the first voltage signal corresponding to the third current signal into the first digital voltage signal corresponding to the third current signal, the controller determines whether the first digital voltage signal corresponding to the third current signal meets the threshold condition, when the first digital voltage signal corresponding to the third current signal meets the threshold condition, that is the voltage value of the first digital voltage signal is greater than the second threshold voltage value, the first digital voltage signal corresponding to the third current signal is converted into a full-range digital voltage signal, and the converted full-range digital voltage signal is saved in the third digital register, when the voltage value of the first digital voltage signal corresponding to the third current signal does not meet the threshold condition, that is the voltage value of the first digital voltage signal is less than the second threshold voltage value, the first digital voltage signal corresponding to the third current signal is discarded.

At the second gear selection stage S32 of the third color sample stage S3, the third photoelectric sensor $D_3$ converts the light of the third color into the third current signal and writes it into the third node N3; the signal of the third element selection signal terminal $K_3$ is the high-level signal, the third element selection transistor $T_{K3}$ is turned on, the signal of the third node N3 is written into the fifth node N5, the signal of the second gear selection signal terminal $G_2$ is a high-level signal, the second gear selection transistor $T_{G2}$ is turned on, the signal of the fifth node N5 is written to the seventh node N7, the second sample sub-circuit samples the third current signal to generate the second initial voltage signal corresponding to the third current signal, the second filter sub-circuit filters the second initial voltage signal corresponding to the third current signal to generate the second voltage signal corresponding to the third current signal, the signal selector transmits the second voltage signal corresponding to the third current signal to the signal buffer, the signal buffer stores the second voltage signal corresponding to the third current signal, the analog-to-digital converter converts the second voltage signal corresponding to the third current signal into the second digital voltage signal corresponding to the third current signal, the controller determines whether the second digital voltage signal corresponding to the third current signal meets the threshold condition, when the second digital voltage signal corresponding to the third current signal meets the threshold condition, that is the voltage value of the second digital voltage signal is greater than the first threshold voltage value and less than the second threshold voltage value, the second digital voltage signal corresponding to the third current signal is converted into a full-range digital voltage signal, and the converted full-range digital voltage signal is saved in the third digital register, when the voltage value of the second digital voltage signal corresponding to the third current signal does not meet the threshold condition, that is the voltage value of the second digital voltage signal is less than the first threshold voltage value or greater than the second threshold voltage value, the second digital voltage signal corresponding to the third current signal is discarded.

At the third gear selection stage S33 of the third color sample stage S3, the third photoelectric sensor $D_3$ converts the light of the third color into the third current signal and writes it into the third node N3; the signal of the third element selection signal terminal $K_3$ is the high-level signal, the third element selection transistor $T_{K3}$ is turned on, the signal of the third node N3 is written into the fifth node N5, the signal of the third gear selection signal terminal $G_3$ is a high-level signal, the third gear selection transistor $T_{G3}$ is turned on, the signal of the fifth node N5 is written to the eighth node N8, the third sample sub-circuit samples the third current signal to generate the third initial voltage signal corresponding to the third current signal, the third filter sub-circuit filters the third initial voltage signal corresponding to the third current signal to generate the third voltage signal corresponding to the third current signal, the signal selector transmits the third voltage signal corresponding to the third current signal to the signal buffer, the signal buffer stores the third voltage signal corresponding to the third current signal, the analog-to-digital converter converts the third voltage signal corresponding to the third current signal into the third digital voltage signal corresponding to the third current signal, the controller determines whether the third digital voltage signal corresponding to the third current signal meets the threshold condition, when the third digital voltage signal corresponding to the third current signal meets the threshold condition, that is the voltage value of the third digital voltage signal is greater than the first threshold voltage value and less than the second threshold voltage value, the third digital voltage signal corresponding to the third current signal is converted into a full-range digital voltage signal, and the converted full-range digital voltage signal is saved in the third digital register, when the voltage value of the third digital voltage signal corresponding to the third current signal does not meet the threshold condition, that is the voltage value of the third digital voltage signal is less than the first threshold voltage value or greater than the second threshold voltage value, the third digital voltage signal corresponding to the third current signal is discarded.

At the fourth gear selection stage S34 of the third color sample stage S3, the third photoelectric sensor $D_3$ converts the light of the third color into the third current signal and writes it into the third node N3; the signal of the third element selection signal terminal $K_3$ is the high-level signal, the third element selection transistor $T_{K3}$ is turned on, the signal of the third node N3 is written into the fifth node N5, the signal of the fourth gear selection signal terminal $G_4$ is a high-level signal, the fourth gear selection transistor $T_{G4}$ is turned on, the signal of the fifth node N5 is written to the ninth node N9, the fourth sample sub-circuit samples the third current signal to generate the fourth initial voltage signal corresponding to the third current signal, the fourth filter sub-circuit filters the fourth initial voltage signal corresponding to the third current signal to generate the fourth voltage signal corresponding to the third current signal, the signal selector transmits the fourth voltage signal corresponding to the third current signal to the signal buffer, the signal buffer stores the fourth voltage signal corresponding to the third current signal, the analog-to-digital converter converts the fourth voltage signal corresponding to the third current signal into the fourth digital voltage signal corresponding to the third current signal, the controller determines whether the fourth digital voltage signal corresponding to the third current signal meets the threshold condition, when the fourth digital voltage signal corresponding to the third current signal meets the threshold condition, that is the voltage value of the third digital voltage signal is less than the first threshold voltage value, the fourth digital voltage signal corresponding to the third current signal is converted into a full-range digital voltage signal, and the converted full-range digital voltage signal is saved in the third digital register, when the voltage value of the fourth digital voltage signal corresponding to the third current signal does not meet the threshold condition, that is the voltage value of the fourth digital voltage signal is greater than the first threshold voltage value, the fourth digital voltage signal corresponding to the third current signal is discarded.

There is a blank stage between the third color sample stage and the fourth color sample stage, at the blank stage, all control signals are low-level signals, all transistors are turned off, and no sampling is carried out.

The controller determines whether the voltage values of the first digital voltage signal to the fourth digital voltage signal corresponding to the fourth current signal meet the threshold condition when the third current signal is not the fourth current signal, if yes, executes the fourth color sample stage.

At the first gear selection stage S41 of the fourth color sample stage S4, a fourth photoelectric sensor $D_4$ converts the light of a fourth color into a fourth current signal and writes it into the fourth node N4; a signal of the fourth element selection signal terminal $K_4$ is a high-level signal, the fourth element selection transistor $T_{K4}$ is turned on, the signal of the fourth node N4 is written into the fifth node N5, the signal of the first gear selection signal terminal $G_1$ is a high-level signal, the first gear selection transistor $T_{G1}$ is turned on, a signal of the fifth node N5 is written to the sixth node N6, a first sample sub-circuit samples the fourth current signal to generate the first initial voltage signal corresponding to the fourth current signal, the first filter sub-circuit filters the first initial voltage signal corresponding to the fourth current signal to generate the first voltage signal corresponding to the fourth current signal, the signal selector transmits the first voltage signal corresponding to the fourth current signal to the signal buffer, the signal buffer stores the first voltage signal corresponding to the fourth current signal, the analog-to-digital converter converts the first voltage signal corresponding to the fourth current signal into the first digital voltage signal corresponding to the fourth current signal, the controller determines whether the first digital voltage signal corresponding to the fourth current signal meets the threshold condition, when the first digital voltage signal corresponding to the fourth current signal meets the threshold condition, that is the voltage value of the first digital voltage signal is greater than the second threshold voltage value, the first digital voltage signal corresponding to the third current signal is converted into a full-range digital voltage signal, and the converted full-range digital voltage signal is saved in the fourth digital register, when the voltage value of the first digital voltage signal corresponding to the fourth current signal does not meet the threshold condition, that is the voltage value of the first digital voltage signal is less than the second threshold voltage value, the first digital voltage signal corresponding to the fourth current signal is discarded.

At the second gear selection stage S42 of the fourth color sample stage S4, the fourth photoelectric sensor $D_4$ converts the light of the fourth color into the fourth current signal and writes it into the fourth node N4; the signal of the fourth element selection signal terminal $K_4$ is the high-level signal, the fourth element selection transistor $T_{K4}$ is turned on, the signal of the fourth node N4 is written into the fifth node N5, the signal of the second gear selection signal terminal $G_2$ is a high-level signal, the second gear selection transistor $T_{G2}$ is turned on, the signal of the fifth node N5 is written to the seventh node N7, the second sample sub-circuit samples the fourth current signal to generate the second initial voltage signal corresponding to the fourth current signal, the second filter sub-circuit filters the second initial voltage signal corresponding to the fourth current signal to generate the second voltage signal corresponding to the fourth current signal, the signal selector transmits the second voltage signal corresponding to the fourth current signal to the signal buffer, the signal buffer stores the second voltage signal corresponding to the fourth current signal, the analog-to-digital converter converts the second voltage signal corresponding to the fourth current signal into the second digital voltage signal corresponding to the fourth current signal, the controller determines whether the second digital voltage signal corresponding to the fourth current signal meets the threshold condition, when the second digital voltage signal corresponding to the fourth current signal meets the threshold condition, that is the voltage value of the second digital voltage signal is greater than the first threshold voltage value and less than the second threshold voltage value, the second digital voltage signal corresponding to the fourth current signal is converted into a full-range digital voltage signal, and the converted full-range digital voltage signal is saved in the fourth digital register, when the voltage value of the second digital voltage signal corresponding to the fourth current signal does not meet the threshold condition, that is the voltage value of the second digital voltage signal is less than the first threshold voltage value or greater than the second threshold voltage value, the second digital voltage signal corresponding to the fourth current signal is discarded.

At the third gear selection stage S43 of the fourth color sample stage S4, the fourth photoelectric sensor $D_4$ converts the light of the fourth color into the fourth current signal and writes it into the fourth node N4; the signal of the fourth element selection signal terminal $K_4$ is the high-level signal, the fourth element selection transistor $T_{K4}$ is turned on, the signal of the fourth node N4 is written into the fifth node N5, the signal of the third gear selection signal terminal $G_3$ is a high-level signal, the third gear selection transistor $T_{G3}$ is turned on, the signal of the fifth node N5 is written to the eighth node N8, the third sample sub-circuit samples the fourth current signal to generate the third initial voltage signal corresponding to the third current signal, the third filter sub-circuit filters the third initial voltage signal corresponding to the fourth current signal to generate the third voltage signal corresponding to the fourth current signal, the signal selector transmits the third voltage signal corresponding to the fourth current signal to the signal buffer, the signal buffer stores the third voltage signal corresponding to the fourth current signal, the analog-to-digital converter converts the third voltage signal corresponding to the fourth current signal into the third digital voltage signal corresponding to the fourth current signal, the controller determines whether the third digital voltage signal corresponding to the fourth current signal meets the threshold condition, when the third digital voltage signal corresponding to the fourth current signal meets the threshold condition, that is the voltage value of the third digital voltage signal is greater than the first threshold voltage value and less than the second threshold voltage value, the third digital voltage signal corresponding to the fourth current signal is converted into a full-range digital voltage signal, and the converted full-range digital voltage signal is saved in the fourth digital register, when the voltage value of the third digital voltage signal corresponding to the fourth current signal does not meet the threshold condition, that is the voltage value of the third digital voltage signal is less than the first threshold voltage value or greater than the second threshold voltage value, the third digital voltage signal corresponding to the fourth current signal is discarded.

At the fourth gear selection stage S44 of the fourth color sample stage S4, the fourth photoelectric sensor $D_4$ converts the light of the fourth color into the fourth current signal and writes it into the fourth node N4; the signal of the fourth element selection signal terminal $K_4$ is the high-level signal, the fourth element selection transistor $T_{K4}$ is turned on, the signal of the fourth node N4 is written into the fifth node N5, the signal of the fourth gear selection signal terminal $G_4$ is a high-level signal, the fourth gear selection transistor $T_{G4}$ is turned on, the signal of the fifth node N5 is written to the ninth node N9, the fourth sample sub-circuit samples the fourth current signal to generate the fourth initial voltage signal corresponding to the fourth current signal, the fourth filter sub-circuit filters the fourth initial voltage signal corresponding to the fourth current signal to generate the fourth voltage signal corresponding to the fourth current signal, the signal selector transmits the fourth voltage signal corresponding to the fourth current signal to the signal buffer, the signal buffer stores the fourth voltage signal corresponding to the fourth current signal, the analog-to-digital converter converts the fourth voltage signal corresponding to the fourth current signal into the fourth digital voltage signal corresponding to the fourth current signal, the controller determines whether the fourth digital voltage signal corresponding to the fourth current signal meets the threshold condition, when the fourth digital voltage signal corresponding to the fourth current signal meets the threshold condition, that is the voltage value of the third digital voltage signal is less than the first threshold voltage value, the fourth digital voltage signal corresponding to the fourth current signal is converted into a full-range digital voltage signal, and the converted full-range digital voltage signal is saved in the fourth digital register, when the voltage value of the fourth digital voltage signal corresponding to the fourth current signal does not meet the threshold condition, that is the voltage value of the fourth digital voltage signal is greater than the first threshold voltage value, the fourth digital voltage signal corresponding to the fourth current signal is discarded.

The controller determines whether the voltage values of the first digital voltage signal to the fourth digital voltage signal corresponding to the first current signal corresponding to the newly collected first color light meet the threshold condition, if yes, executes a new fourth color sample stage.

By controlling the turn on sequence of multiple element selection transistors and multiple gear selection switch transistors, the present disclosure can collect the first current signal to the fourth current signal according to the set sequence and convert to the first voltage signal to the fourth voltage signal corresponding to the current signals under different gears, thus ensuring the sample accuracy of the current signal.

Figure 10:
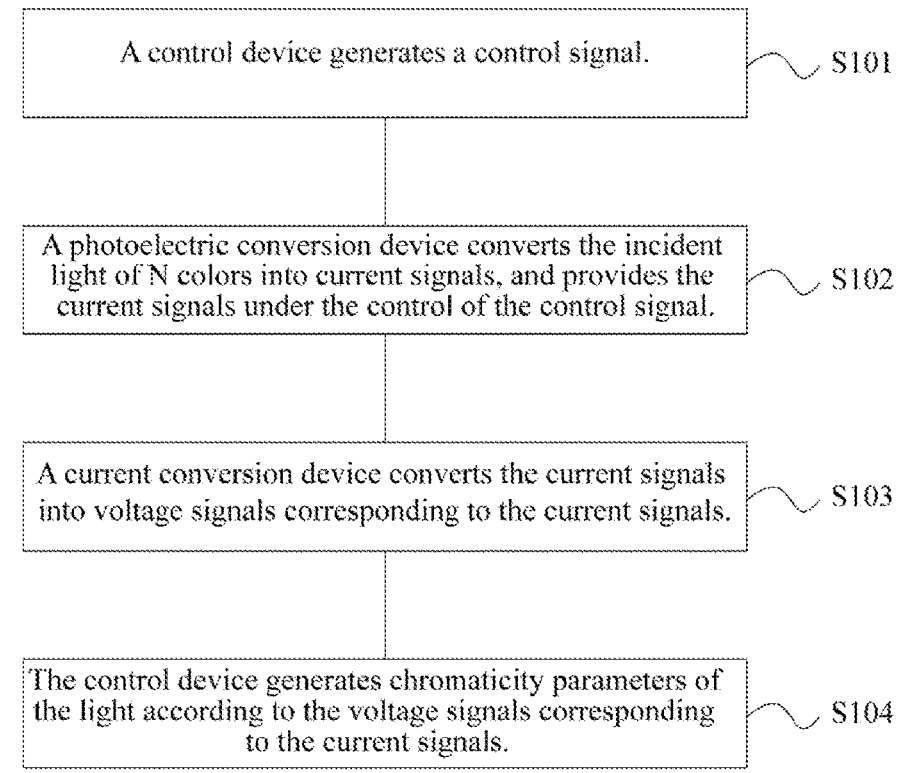
FIG. 10 is a flowchart of a light detection method provided by an embodiment of the present disclosure.

An embodiment of the present disclosure also provides a light detection method, and FIG. 10 is a flowchart of a light detection method provided by an embodiment of the present disclosure. As shown in FIG. 10, the light detection method provided by an embodiment of the present disclosure may include the following acts:

Step S101: A control device generates a control signal.

Step S102: A photoelectric conversion device converts the incident light of N colors into current signals, and provides the current signals under the control of the control signal.

Step S103: A current conversion device converts the current signals into voltage signals corresponding to the current signals.

Step S104: The control device generates chromaticity parameters of the light according to the voltage signals corresponding to the current signals.

In an exemplary embodiment, the chromaticity parameters may include brightness, color temperature, and color coordinates.

The light detection method is provided to be applied to the light detection structure provided in any of the aforementioned embodiments and realization principles and realization effects are similar, and which will not be repeated herein.

In an exemplary embodiment, Step 102 may include converting the incident light of a first color to a first current signal and writing the first current signal to a first node, converting the incident light of a second color to a second current signal and writing the second current signal to a second node, converting the incident light of a third color to a third current signal and writing the third current signal to a third node, converting the incident light of a fourth color to a fourth current signal and writing the fourth current signal to a fourth node.

In an exemplary embodiment, Step 102 further includes providing the signal of the first node, the second node, the third node, or the fourth node to a fifth node in a time-sharing manner under the control of the signal from a first element selection signal terminal to a fourth element selection signal terminal; a signal of the fifth node is provided to a sixth node, a seventh node, an eighth node and a ninth node in a time-sharing manner under the control of the signal from a first gear selection signal terminal to a fourth gear selection signal terminal.

In an exemplary embodiment, providing the signal of the first node, the second node, the third node or the fourth node to the fifth node in a time-sharing manner under the control of the signal from the first element selection signal terminal to the fourth element selection signal terminal includes providing the signal of the first node to the fifth node under the control of the signal from the first element selection signal terminal, providing the signal of the first node to the fifth node under the control of the signal from the second element selection signal terminal, providing the signal of the first node to the fifth node under the control of the signal from the third element selection signal terminal, and providing the signal of the first node to the fifth node under the control of the signal from the fourth element selection signal terminal.

In an exemplary embodiment, providing the signal of the fifth node to the sixth node, the seventh node, the eighth node and the ninth node in a time-sharing manner under the control of the signal from the first gear selection signal terminal to the fourth gear selection signal terminal includes providing the signal of the fifth node to the sixth node under the control of the signal from the first gear selection signal terminal, providing the signal of the fifth node to the seventh node under the control of the signal from the second gear selection signal terminal, providing the signal of the fifth node to the eighth node under the control of the signal from the third gear selection signal terminal, and providing the signal of the fifth node to the ninth node under the control of the signal from the fourth gear selection signal terminal.

In an exemplary embodiment, the voltage signals include a first voltage signal to a fourth voltage signal.

In an exemplary embodiment, Step S103 may include sampling the signals of the sixth node to the ninth node, generating a first initial voltage signal to a fourth initial voltage signal corresponding to the current signal, and providing a first initial voltage signal to a fourth initial voltage signal corresponding to the current signals to a tenth node to a thirteenth node, respectively; filtering the first initial voltage signal to the fourth initial voltage signal corresponding to the current signal, generating the first voltage signal to the fourth voltage signal corresponding to the current signal, and providing the first voltage signal to the fourth voltage signal corresponding to the current signals to the control device, respectively.

In an exemplary embodiment, sampling signals from a sixth node to a ninth node, generating a first initial voltage signal to a fourth initial voltage signal corresponding to the current signals, and providing the first initial voltage signal to the fourth initial voltage signal corresponding to the current signals to the tenth node to the thirteenth node, respectively, may include: Sampling the signal of the sixth node to generate a first initial voltage signal corresponding to the current signal, providing the first initial voltage signal corresponding to the current signals to the tenth node, sampling the signal of the seventh node to generate a second initial voltage signal corresponding to the current signals, providing the second initial voltage signal corresponding to the current signals to the eleventh node, sampling the signal of the eighth node to generate a third initial voltage signal corresponding to the current signals, providing the third initial voltage signal corresponding to the current signals to the twelfth node, sampling the signal of the ninth node to generate a fourth initial voltage signal corresponding to the current signal, and providing the fourth initial voltage signal corresponding to the current signals to the thirteenth node.

In an exemplary embodiment, filtering a first initial voltage signal to a fourth initial voltage signal corresponding to the current signal, generating a first voltage signal to a fourth voltage signal corresponding to the current signal, and providing the first voltage signal to the fourth voltage signal corresponding to the current signals to a control device, respectively, may include: The signal of the tenth node is filtered to generate a first voltage signal corresponding to the current signal, the first voltage signal corresponding to the current signals is provided to the control device, the signal of the eleventh node is filtered to generate a second voltage signal corresponding to the current signal, the second voltage signal corresponding to the current signals is provided to the control device, the signal of the twelfth node is filtered to generate a third voltage signal corresponding to the current signals, the third voltage signal corresponding to the current signals is provided to the control device, the signal of the thirteenth node is filtered to generate a fourth voltage signal corresponding to the current signals and the fourth voltage signal corresponding to the current signals is provided to the control device.

In an exemplary embodiment, Step S104 may include converting the first voltage signal to the fourth voltage signal corresponding to the current signals into the first digital voltage signal to the fourth digital voltage signal corresponding to the current signal; according to the first digital voltage signal to the fourth digital voltage signal corresponding to the current signal, a chromaticity parameters of the light is generated.

In an exemplary embodiment, generating the chromaticity parameters of the light from the first digital voltage signal to the fourth digital voltage signal corresponding to the current signals may include storing a first threshold voltage value and a second threshold voltage value in advance; sequentially judging whether the voltage values of the first digital voltage signal to the fourth digital voltage signal corresponding to the i-th current signal meet the corresponding threshold condition, converting the digital voltage signal corresponding to the i-th current signal meeting the corresponding threshold condition into a full-range digital voltage signal, and storing the converted full-range digital voltage signal in the i-th digital register; the chromaticity parameters of the light is generated according to the full-range digital voltage signal in the first digital register to the fourth digital register.

The threshold condition corresponding to the first digital voltage signal corresponding to an i-th current signal is greater than the second threshold voltage value, the threshold condition corresponding to the second digital voltage signal and the third digital voltage signal corresponding to the i-th current signal is greater than the first threshold voltage value and less than the second threshold voltage value, the threshold condition corresponding to the fourth digital voltage signal corresponding to the i-th current signal is less than the first threshold voltage value, the first threshold voltage value is greater than the minimum input voltage value of the analog-to-digital converter, and the second threshold voltage value is less than the maximum input voltage value of the mode converter.

In an exemplary embodiment, converting the digital voltage signal corresponding to the i-th current signal that meets the threshold condition into a full-range digital voltage signal may include $V_{Dcount}=V_{Dj}/Gain_j$, a j-th digital voltage signal is converted into a full-range digital voltage signal Dcount, wherein the j-th digital voltage signal is a digital voltage signal corresponding to the i-th current signal meeting a threshold condition, Gain; is an amplification factor, $Gain_j=K^j$, $V_{Dcount}$ is the voltage value of the full-range digital voltage signal, $V_{Dj}$ is the voltage value of the j-th digital voltage signal, j=1, 2, 3 or 4.

Figure 11:
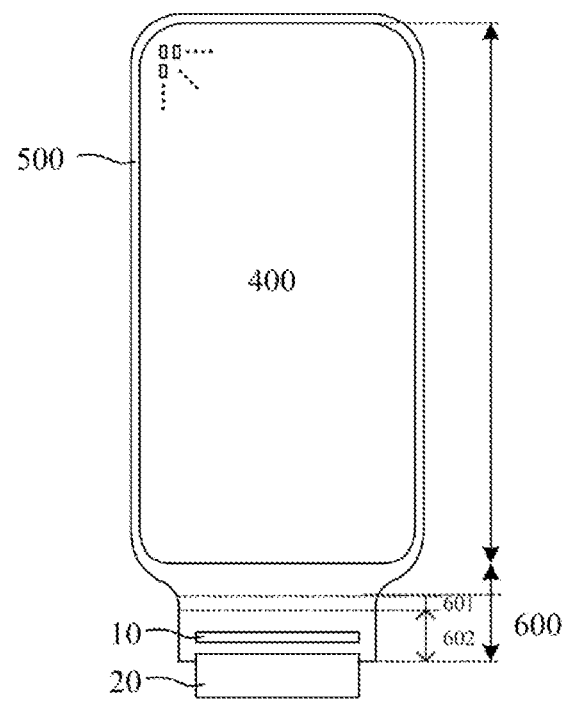
FIG. 11 is a schematic diagram of a structure of a display substrate.

An embodiment of the present disclosure also provides a display substrate, and FIG. 11 is a schematic diagram of a structure of a display substrate. As shown in FIG. 11, the display substrate provided by an embodiment of the present disclosure includes a display area 400 and a non-display area and the non-display area is provided with a light detection structure.

The light detection structure is the light detection structure provided by any of the aforementioned embodiments and realization principles and realization effects are similar, and which will not be repeated herein.

In an exemplary embodiment, the display area 400 may include multiple sub-pixels arranged regularly, the sub-pixels may include a pixel drive circuit and a light emitting device.

As shown in FIG. 11, the non-display area includes a bezel area 500 and a bonding area 600, the bonding area 600 is located on a side of the bezel area 500 away from the display area 400, a photoelectric conversion device in the light detection structure is disposed in the bezel area, and a current conversion device and a control device in the light detection structure are provided in the bonding area.

In an exemplary embodiment, the bonding area 600 may include a bonding circuit that connects a signal line to an external driver, and the bezel area 500 may include a gate driver circuit and a power supply line for transmitting voltage signals to the multiple sub-pixels.

In an exemplary embodiment, the bonding area 600 may include a bending region 601 and a compound circuit region 602.

In an exemplary implementation, the bending region 601 may be bent with a curvature, so that a surface of the composite circuit area 602 may be turned over, that is, a surface of the composite circuit area 602 facing upwards may be changed to be facing downwards by the bending of the bending area 601. In an exemplary implementation, when the bending region 601 is bent, the compound circuit region 602 may be overlapped with the display area 400.

In an exemplary implementation, the compound circuit region 602 may include an electrostatic prevention region, a drive chip region, and a bonding pin region. An Integrated Circuit (IC) 10 may be bonded to the drive chip region, and a Flexible Printed Circuit (FPC) 20 may be bonded to the bonding pin region. In an exemplary implementation, the integrated circuit 10 may generate a drive signal required for driving the sub-pixels and may provide the drive signal to the sub-pixels in the display area. For example, the drive signal may be the data signal that drives a luminance of the sub-pixels. In an exemplary implementation, the integrated circuit 10 may be bonded to the drive chip region through an anisotropic conductive film or otherwise. In an exemplary implementation, the bonding pin region may be provided with bonding pads containing multiple PINs and the flexible printed circuit 20 may be bonded to the bonding pads.

In an exemplary embodiment, a current conversion device and a control device in a light detection structure may be integrated in the display substrate, for example, in the integrated circuit in the compound circuit region of the display substrate.

Figure 12:
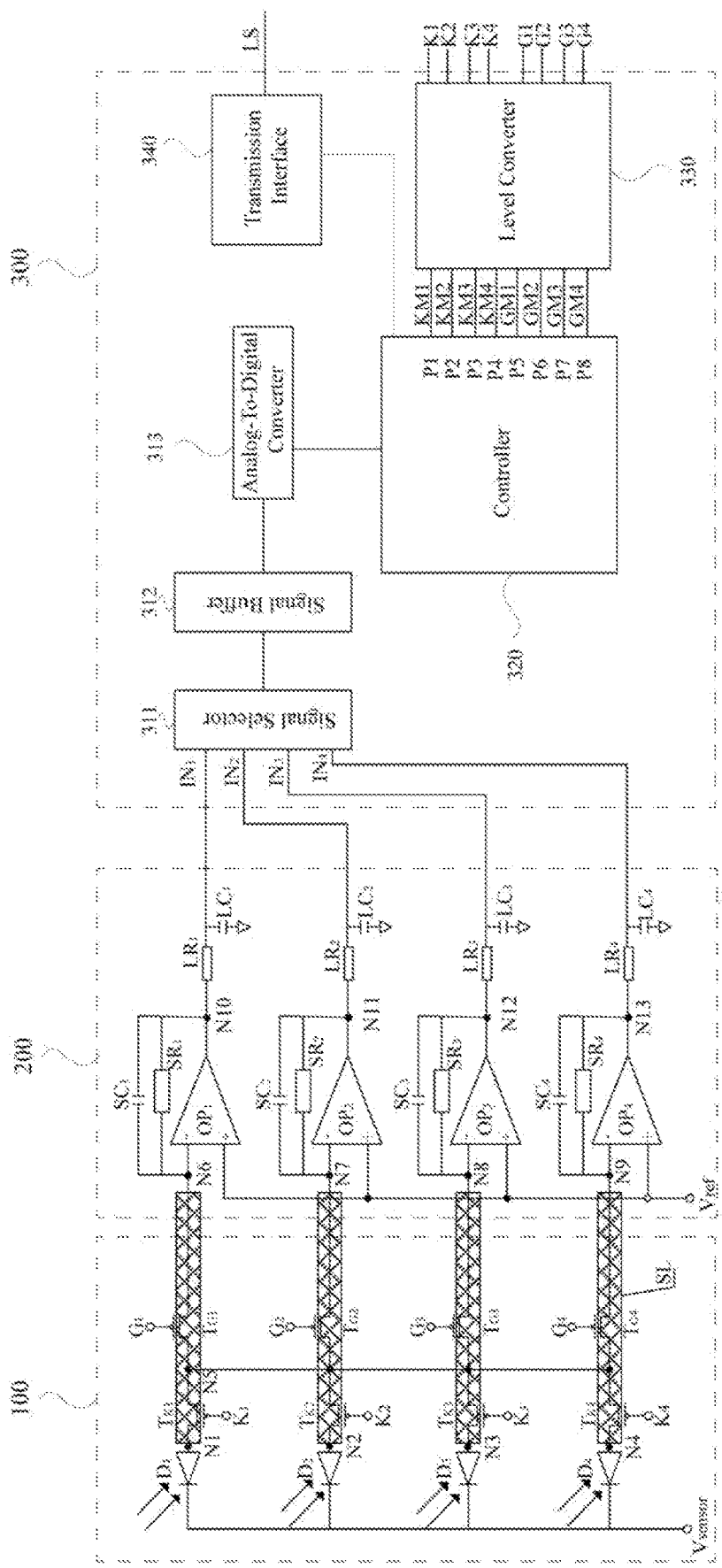
FIG. 12 is a schematic diagram of a structure of a display substrate provided by an exemplary embodiment.

FIG. 12 is a schematic diagram of a structure of a display substrate provided by an exemplary embodiment. As shown in FIG. 12, in an exemplary embodiment, the display substrate may further include a base substrate and four shielded signal lines SL disposed on the base substrate; the photoelectric conversion device includes a first element selection transistor $T_{K1}$ to a fourth element selection transistor $T_{K4}$ and a first gear selection transistor $T_{G1}$ to a fourth gear selection transistor $T_{G4}$. Herein, an orthographic projection of the i-th shielded signal line SL on the base substrate is at least partially overlapped with an orthographic projection of the i-th element selection transistor on the base substrate and an orthographic projection of the i-th shift selection transistor on the base substrate.

In the present disclosure, the orthographic projection of the i-th shielded signal line SL on the base substrate is at least partially overlapped with the orthographic projection of the i-th element selection transistor on the base substrate and the orthographic projection of the i-th shift selection transistor on the base substrate so that the signals flowing through the i-th element selection transistor and the i-th shift selection transistor are not disturbed, and the accuracy of the light detection structure can be improved.

An embodiment of the present disclosure also provides a display device, including a display substrate.

The display substrate is the display substrate according to any of the aforementioned embodiments and realization principles and realization effects are similar, and which will not be repeated herein.

In an exemplary embodiment, the display device may also include an application program. Herein the application program is electrically connected with the light detection structure in the display substrate and is configured to obtain the chromaticity parameters of the light.

In an exemplary embodiment, the application program may be a flash or other application requiring an acquisition of chromaticity parameters of the light, which is not limited in this disclosure.

In an exemplary embodiment, the display device may be any product or component with a display function, such as a liquid crystal panel, electronic paper, an OLED panel, an Active-Matrix Organic Light Emitting Diode (AMOLED for short) panel, a mobile phone, a tablet computer, a television, a display, a notebook computer, a digital photo frame, or a navigator.

When the display device includes a Thin Film Transistor display screen, the transistor in the light detection structure in the display substrate may be a Thin Film Transistor (TFT for short).

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It may be understood that when an element such as a layer, a film, an area, or a substrate is described as being "on" or "under" another element, the element may be "directly" located "on" or "under" the other element, or there may be an intermediate element.

Although the implementations disclosed in the present disclosure are as above, the described contents are only embodiments used for convenience of understanding the present disclosure but are not intended to limit the present disclosure. Any person skilled in the art to which the present disclosure pertains may make any modification and variation in forms and details of implementation without departing from the spirit and scope disclosed in the present disclosure. However, the scope of patent protection of the present disclosure is still subject to the scope defined by the appended claims.

The invention claimed is:

1. A light detection structure comprising: a photoelectric conversion device, a current conversion device, and a control device; wherein
    the photoelectric conversion device is electrically connected with the current conversion device, and is configured to:
        convert an incident light of N colors into current signals, and
        provide the current signals to the current conversion device under a control of a control signal, wherein N is a positive integer greater than or equal to 1;
    the current conversion device is configured to convert the current signals into voltage signals corresponding to the current signals; and
    the control device electrically is connected with the photoelectric conversion device and the current conversion device separately, and is configured to:
        generate the control signals, and generate chromaticity parameters of light according to the voltage signals corresponding to the current signals, wherein the chromaticity parameters comprise brightness, color temperature and color coordinates when N=4, the photoelectric conversion device comprises: four photoelectric conversion elements; the four photoelectric conversion elements comprise a first photoelectric conversion element, a second photoelectric conversion element, a third photoelectric conversion element and a fourth photoelectric conversion element, and the current signals comprise a first current signal, a second current signal, a third current signal and a fourth current signal;

the first photoelectric conversion element is electrically connected with a sense signal terminal and a first node respectively, and is configured to convert the incident light of a first color into a first current signal and write the first current signal into the first node;

the second photoelectric conversion element is electrically connected with the sense signal terminal and a second node respectively, and is configured to convert the incident light of a second color into a second current signal and write the second current signal into the second node;

the third photoelectric conversion element is electrically connected with the sense signal terminal and a third node respectively, and is configured to convert the incident light of a third color into a third current signal and write the third current signal into the third node; and the fourth photoelectric conversion element is electrically connected with the sense signal terminal and a fourth node respectively, and is configured to convert the incident light of a fourth color into a fourth current signal and write the fourth current signal into the fourth node; and the first color, the second color, the third color and the fourth color are one of red, green, blue and white, and the first color, the second color, the third color and the fourth color are different colors, and a voltage value of a signal at the sense signal terminal is constant;

the photoelectric conversion device further comprises: an element selection circuit and a gear selection circuit; the control signal comprises a first element selection signal to a fourth element selection signal and a first gear selection signal to a fourth gear selection signal;

the element selection circuit is electrically connected with a first element selection signal terminal to a fourth element selection signal terminal, the first node, the second node, the third node, the fourth node and a fifth node respectively, and is configured to provide a signal of the first node, the second node, the third node or the fourth node to the fifth node in a time-sharing manner under a control of the signals from the first element selection signal terminal to the fourth element selection signal terminal, wherein a signal of the i-th element selection signal terminal is the i-th element selection signal, and i is 1 to 4; and the gear selection circuit is electrically connected with a first gear selection signal terminal to a fourth gear selection signal terminal, the fifth node, a sixth node, a seventh node, an eighth node and a ninth node respectively, and is configured to provide a signal of the fifth node to the sixth node, the seventh node, the eighth node and the ninth node in a time-sharing manner under a control of the signals from the first gear selection signal terminal to the fourth gear selection signal terminal, and a signal of the i-th gear selection signal terminal is the i-th gear selection signal.

2. The light detection structure according to claim 1, wherein the first photoelectric conversion element comprises: a first photoelectric sensor, the second photoelectric conversion element comprises: a second photoelectric sensor, the third photoelectric conversion element comprises: a third photoelectric sensor, and the fourth photoelectric conversion element comprises: a fourth photoelectric sensor; wherein an anode of the first photoelectric sensor is electrically connected with the first node, a cathode of the first photoelectric sensor is electrically connected with the sense signal terminal, an anode of the second photoelectric sensor is electrically connected with the second node, a cathode of the second photoelectric sensor is electrically connected with the sense signal terminal, an anode of the third photoelectric sensor is electrically connected with the third node, a cathode of the third photoelectric sensor is electrically connected with the sense signal terminal, an anode of the fourth photoelectric sensor is electrically connected with the fourth node, and a cathode of the fourth photoelectric sensor is electrically connected with the sense signal terminal; or the cathode of the first photoelectric sensor is electrically connected with the first node, the anode of the first photoelectric sensor is electrically connected with the sense signal terminal, the cathode of the second photoelectric sensor is electrically connected with the second node, the anode of the second photoelectric sensor is electrically connected with the sense signal terminal, the cathode of the third photoelectric sensor is electrically connected with the third node, the anode of the third photoelectric sensor is electrically connected with the sense signal terminal, the cathode of the fourth photoelectric sensor is electrically connected with the fourth node, and the anode of the fourth photoelectric sensor is electrically connected with the sense signal terminal.

3. The light detection structure according to claim 1, wherein when the i-th element selection signal is an effective level signal, all other element selection signals except the i-th element selection signal are dummy level signals, and an end time when the i-th element selection signal is an effective level signal is earlier than or equal to a start time when the (i+1)-th element selection signal is an effective level signal;

when the i-th gear selection signal is an effective level signal, all other gear selection signals except the i-th gear selection signal are dummy level signals; and when the i-th element selection signal is an effective level signal, the first gear selection signal to the fourth gear selection signal are sequentially effective level signals, and the duration of the i-th element selection signal being an effective level signal is greater than or equal to the sum of the duration of the first gear selection signal to the fourth gear selection signal being effective level signals.

4. The light detection structure according to claim 3, wherein when an end time at which the i-th element selection signal is an effective level signal is earlier than a start time at which the (i+1)-th element selection signal is an effective level signal, an interval time between the end time at which the i-th element selection signal is an effective level signal and the start time at which the (i+1)-th element selection signal is an effective level signal is equal to a duration for which any of the first gear selection signal to the fourth gear selection signal is an effective level signal.

5. The light detection structure according to claim 1, wherein
the element selection circuit comprises: a first element selection sub-circuit to a fourth element selection sub-circuit;
the first element selection sub-circuit is electrically connected with the first element selection signal terminal, the first node and the fifth node, respectively, and is configured to provide a signal of the first node to the fifth node under a control of the signal of the first element selection signal terminal;
the second element selection sub-circuit is electrically connected with the second element selection signal terminal, the second node and the fifth node, respectively, and is configured to provide a signal of the second node to the fifth node under a control of the signal of the second element selection signal terminal;
the third element selection sub-circuit is electrically connected with the third element selection signal terminal, the third node and the fifth node, respectively, and is configured to provide a signal of the third node to the fifth node under a control of the signal of the third element selection signal terminal; and
the fourth element selection sub-circuit is electrically connected with the fourth element selection signal terminal, the fourth node and the fifth node, respectively, and is configured to provide a signal of the fourth node to the fifth node under a control of the signal of the fourth element selection signal terminal.

6. The light detection structure according to claim 5, wherein
the first element selection sub-circuit comprises: a first element selection transistor, the second element selection sub-circuit comprises: a second element selection transistor, the third element selection sub-circuit comprises: a third element selection transistor, and the fourth element selection sub-circuit comprises: a fourth element selection transistor;
a control electrode of the first element selection transistor is electrically connected with the first element selection signal terminal, a first electrode of the first element selection transistor is electrically connected with the first node, and a second electrode of the first element selection transistor is electrically connected with the fifth node;
a control electrode of the second element selection transistor is electrically connected with the second element selection signal terminal, a first electrode of the second element selection transistor is electrically connected with the second node, and a second electrode of the second element selection transistor is electrically connected with the fifth node;
a control electrode of the third element selection transistor is electrically connected with the third element selection signal terminal, a first electrode of the third element selection transistor is electrically connected with the third node, and a second electrode of the third element selection transistor is electrically connected with the fifth node; and
a control electrode of the fourth element selection transistor is electrically connected with the fourth element selection signal terminal, a first electrode of the fourth element selection transistor is electrically connected with the fourth node, and a second electrode of the fourth element selection transistor is electrically connected with the fifth node.

7. The light detection structure according to claim 1, wherein
the gear selection circuit comprises: a first gear selection sub-circuit to a fourth gear selection sub-circuit;
the first gear selection sub-circuit is electrically connected with the first gear selection signal terminal, the fifth node and the sixth node, respectively, and is configured to provide a signal of the fifth node to the sixth node under a control of a signal of the first gear selection signal terminal;
the second gear selection sub-circuit is electrically connected with the second gear selection signal terminal, the fifth node and the seventh node, respectively, and is configured to provide a signal of the fifth node to the seventh node under a control of a signal of the second gear selection signal terminal;
the third gear selection sub-circuit is electrically connected with the third gear selection signal terminal, the fifth node and the eighth node, respectively, and is configured to provide a signal of the fifth node to the eighth node under a control of a signal of the third gear selection signal terminal; and
the fourth gear selection sub-circuit is electrically connected with the fourth gear selection signal terminal, the fifth node and the ninth node, respectively, and is configured to provide a signal of the fifth node to the ninth node under a control of a signal of the fourth gear selection signal terminal.

8. The light detection structure according to claim 7, wherein
the first gear selection sub-circuit comprises: a first gear selection transistor, the second gear selection sub-circuit comprises: a second gear selection transistor, the third gear selection sub-circuit comprises: a third gear selection transistor, and the fourth gear selection sub-circuit comprises: a fourth gear selection transistor;
a control electrode of the first gear selection transistor is electrically connected with the first gear selection signal terminal, a first electrode of the first gear selection transistor is electrically connected with the fifth node, and a second electrode of the first gear selection transistor is electrically connected with the sixth node;
a control electrode of the second gear selection transistor is electrically connected with the second gear selection signal terminal, a first electrode of the second gear selection transistor is electrically connected with the fifth node, and a second electrode of the second gear selection transistor is electrically connected with the seventh node;
a control electrode of the third gear selection transistor is electrically connected with the third gear selection signal terminal, a first electrode of the third gear selection transistor is electrically connected with the fifth node, and a second electrode of the third gear selection transistor is electrically connected with the eighth node; and
a control electrode of the fourth gear selection transistor is electrically connected with the fourth gear selection signal terminal, a first electrode of the fourth gear selection transistor is electrically connected with the fifth node, and a second electrode of the fourth gear selection transistor is electrically connected with the ninth node.

9. The light detection structure according to claim 1, wherein
the voltage signals comprise: a first voltage signal to a fourth voltage signal, and the current conversion device comprises: a sample circuit and a filter circuit;
the sample circuit is electrically connected with the sixth node to a thirteenth node and a reference signal terminal respectively, and is configured to:
sample the signals from the sixth node to the ninth node,
generate a first initial voltage signal to a fourth initial voltage signal corresponding to the current signals, and
respectively provide the first initial voltage signal to the fourth initial voltage signal corresponding to the current signals to the tenth node to the thirteenth node; and
the filter circuit is electrically connected with the tenth node to the thirteenth node, a ground terminal and the control device respectively, and is configured to:
filter the first initial voltage signal to the fourth initial voltage signal corresponding to the current signals,
generate the first voltage signal to the fourth voltage signal corresponding to the current signals, and
provide the first voltage signal to the fourth voltage signal corresponding to the current signals to the control device respectively.

10. The light detection structure according to claim 9, wherein
the sample circuit comprises: a first sample sub-circuit, a second sample sub-circuit, a third sample sub-circuit, and a fourth sample sub-circuit;
the first sample sub-circuit is electrically connected with the sixth node, the tenth node and the reference signal terminal respectively, and is configured to sample the signal of the sixth node, generate the first initial voltage signal corresponding to the current signals, and provide the first initial voltage signal corresponding to the current signals to the tenth node;
the second sample sub-circuit is electrically connected with the seventh node, the eleventh node and the reference signal terminal respectively, and is configured to sample the signal of the seventh node, generate the second initial voltage signal corresponding to the current signals, and provide the second initial voltage signal corresponding to the current signals to the eleventh node;
the third sample sub-circuit is electrically connected with the eighth node, the twelfth node and the reference signal terminal respectively, and is configured to sample the signal of the eighth node, generate the third initial voltage signal corresponding to the current signals, and provide the third initial voltage signal corresponding to the current signals to the twelfth node; and
the fourth sample sub-circuit is electrically connected with the ninth node, the thirteenth node and the reference signal terminal respectively, and is configured to sample the signal of the ninth node, generate the fourth initial voltage signal corresponding to the current signal, and provide the fourth initial voltage signal corresponding to the current signals to the thirteenth node.

11. The light detection structure according to claim 10, wherein
the first sample sub-circuit comprises: a first operational amplifier, a first sample resistor, and a first feedback capacitor; the second sample sub-circuit comprises: a second operational amplifier, a second sample resistor, and a second feedback capacitor; the third sample sub-circuit comprises: a third operational amplifier, a third sample resistor, and a third feedback capacitor; the fourth sample sub-circuit comprises: a fourth operational amplifier, a fourth sample resistor, and a fourth feedback capacitor;
a non-inverting input terminal of the first operational amplifier is electrically connected with the reference signal terminal, an inverting input terminal of the first operational amplifier is electrically connected with the sixth node, and an output terminal of the first operational amplifier is electrically connected with the tenth node;
a first terminal of the first sample resistor is electrically connected with the sixth node and a second terminal of the first sample resistor is electrically connected with the tenth node;
a first terminal of the first feedback capacitor is electrically connected with the sixth node and a second terminal of the first feedback capacitor is electrically connected with the tenth node;
a non-inverting input terminal of the second operational amplifier is electrically connected with the reference signal terminal, an inverting input terminal of the second operational amplifier is electrically connected with the seventh node, and an output terminal of the second operational amplifier is electrically connected with the eleventh node;
a first terminal of the second sample resistor is electrically connected with the seventh node and a second terminal of the second sample resistor is electrically connected with the eleventh node;
a first terminal of the second feedback capacitor is electrically connected with the seventh node and a second terminal of the second feedback capacitor is electrically connected with the eleventh node;
a non-inverting input terminal of the third operational amplifier is electrically connected with the reference signal terminal, an inverting input terminal of the third operational amplifier is electrically connected with the eighth node, and an output terminal of the third operational amplifier is electrically connected with the twelfth node;
a first terminal of the third sample resistor is electrically connected with the eighth node and a second terminal of the third sample resistor is electrically connected with the twelfth node;
a first terminal of the third feedback capacitor is electrically connected with the eighth node and a second terminal of the third feedback capacitor is electrically connected with the twelfth node;
a non-inverting input terminal of the fourth operational amplifier is electrically connected with the reference signal terminal, an inverting input terminal of the fourth operational amplifier is electrically connected with the ninth node, and an output terminal of the fourth operational amplifier is electrically connected with the thirteenth node;
a first terminal of the fourth sample resistor is electrically connected with the ninth node and a second terminal of the fourth sample resistor is electrically connected with the thirteenth node;
a first terminal of the fourth feedback capacitor is electrically connected with the ninth node and a second terminal of the fourth feedback capacitor is electrically connected with the thirteenth node; and a resistance R1 of the first sample resistor, a resistance R2 of the second sample resistor, a resistance R3 of the third sample resistor, and a resistance R4 of the fourth sample resistor satisfy the following requirements: R1=K×R2-K$^2$×R3=K$^3$×R3, and K is a positive integer greater than 1.

12. The light detection structure according to claim 9, wherein
the filter circuit comprises: a first filter sub-circuit, a second filter sub-circuit, a third filter sub-circuit, and a fourth filter sub-circuit;
the first filter sub-circuit is electrically connected with the tenth node, the ground terminal, and the control device respectively, and is configured to filter the signal of the tenth node, generate the first voltage signal corresponding to the current signal, and provide the first voltage signal corresponding to the current signals to the control device;
the second filter sub-circuit is electrically connected with the eleventh node, the ground terminal, and the control device respectively, and is configured to filter the signal of the eleventh node, generate the second voltage signal corresponding to the current signal, and provide the second voltage signal corresponding to the current signals to the control device;
the third filter sub-circuit is electrically connected with the twelfth node, the ground terminal, and the control device respectively, and is configured to filter the signal of the twelfth node, generate the third voltage signal corresponding to the current signals, and provide the third voltage signal corresponding to the current signals to the control device; and
the fourth filter sub-circuit is electrically connected with the thirteenth node, the ground terminal, and the control device respectively, and is configured to filter the signal of the thirteenth node, generate the fourth voltage signal corresponding to the current signals, and provide the fourth voltage signal corresponding to the current signals to the control device.

13. The light detection structure according to claim 12, wherein
the first filter sub-circuit comprises: a first filter resistor and a first filter capacitor; the second filter sub-circuit comprises a second filter resistor and a second filter capacitor; the third filter sub-circuit comprises a third filter resistor and a third filter capacitor; the fourth filter sub-circuit comprises a fourth filter resistor and a fourth filter capacitor;
a first terminal of the first filter resistor is electrically connected with the tenth node, a second terminal of the first filter resistor is electrically connected with the control device and a first terminal of the first filter capacitor respectively, and a second terminal of the first filter capacitor is electrically connected with the ground terminal;
a first terminal of the second filter resistor is electrically connected with the eleventh node, a second terminal of the second filter resistor is electrically connected with the control device and a first terminal of the second filter capacitor respectively, and a second terminal of the second filter capacitor is electrically connected with the ground terminal;
a first terminal of the third filter resistor is electrically connected with the twelfth node, a second terminal of the third filter resistor is electrically connected with the control device and a first terminal of the third filter capacitor respectively, and a second terminal of the third filter capacitor is electrically connected with the ground terminal; and
a first terminal of the fourth filter resistor is electrically connected with the thirteenth node, a second terminal of the fourth filter resistor is electrically connected with the control device and a first terminal of the fourth filter capacitor respectively, and a second terminal of the fourth filter capacitor is electrically connected with the ground terminal.

14. The light detection structure according to claim 9, wherein
the control device comprises: an analog-to-digital conversion element, a controller, and a level converter;
the analog-to-digital conversion element is electrically connected with the filter circuit and is configured to convert the first voltage signal to the fourth voltage signal corresponding to the current signals into the first digital voltage signal to the fourth digital voltage signal corresponding to the current signal;
the controller is electrically connected with the analog-to-digital conversion element and is configured to generate a first initial element selection signal to a fourth initial element selection signal and a first initial gear selection signal to a fourth initial gear selection signal, and generate the chromaticity parameters of the light according to the first digital voltage signal to the fourth digital voltage signal corresponding to the current signal; and
the level converter is electrically connected with the controller, the first element selection signal terminal to the fourth element selection signal terminal and the first gear selection signal terminal to the fourth gear selection signal terminal, is configured to:
perform level conversion on the first initial element selection signal to the fourth initial element selection signal,
generate the first element selection signal to the fourth element selection signal,
provide the first element selection signal to the fourth element selection signal to the first element selection signal terminal to the fourth element selection signal terminal respectively,
perform level conversion on the first initial gear selection signal to the fourth initial gear selection signal terminal,
generate the first gear selection signal to the fourth gear selection signal, and
provide the first gear selection signal to the fourth gear selection signal to the first gear selection signal terminal to the fourth gear selection signal terminal respectively.

15. The light detection structure according to claim 14, wherein
the analog-to-digital conversion element comprises: a signal selector, a signal buffer, and an analog-to-digital converter;
the signal selector is electrically connected with the filter circuit and the signal buffer respectively, and is configured to transmit the first voltage signal to the fourth voltage signal corresponding to the current signals to the signal buffer in a time-sharing manner;
the signal buffer is configured to store the first voltage signal to the fourth voltage signal corresponding to the time-sharing input current signal of the signal selector; and the analog-to-digital converter is electrically connected with the signal buffer and is configured to convert the first voltage signal to the fourth voltage signal corresponding to the current signals in the signal buffer into the first digital voltage signal to the fourth digital voltage signal corresponding to the current signals in a time-sharing manner;

wherein a voltage value of the signal at the reference signal terminal is constant, and the voltage value of the signal at the reference signal terminal is less than the maximum input voltage value of the analog-to-digital converter and greater than the minimum input voltage value of the analog-to-digital converter.

16. The light detection structure according to claim 14, wherein the controller comprises: eight first interfaces, the first interfaces are configured as standard general purpose input and output ports; and the eight first interfaces are electrically connected with the level converter and are configured to transmit the first initial element selection signal to the fourth initial element selection signal and the first initial gear selection signal to the fourth initial gear selection signal to the level converter, respectively.

17. The light detection structure according to claim 16, wherein the controller further comprises: a first digital register to a fourth digital register;

the controller is configured to:
store a first threshold voltage value and a second threshold voltage value in advance,
judge whether the voltage values of the first digital voltage signal to the fourth digital voltage signal corresponding to the i-th current signal meet a corresponding threshold condition sequentially,
convert the digital voltage signal corresponding to the i-th current signal meeting the corresponding threshold condition into a full-range digital voltage signal, to store the converted full-range digital voltage signal in an i-th digital register, and
generate the chromaticity parameters of the light according to the full-range digital voltage signal in the first digital register to the fourth digital register;

the threshold condition corresponding to the first digital voltage signal corresponding to the i-th current signal is greater than the second threshold voltage value, the threshold condition corresponding to the second digital voltage signal and the third digital voltage signal corresponding to the i-th current signal is greater than the first threshold voltage value and less than the second threshold voltage value, and the threshold condition corresponding to the fourth digital voltage signal corresponding to the i-th current signal is less than the first threshold voltage value, wherein the first threshold voltage value is greater than the minimum input voltage value of the analog-to-digital converter and the second threshold voltage value is less than the maximum input voltage value of the mode converter; and the difference between the first threshold voltage value and the minimum input voltage value of the analog-to-digital converter is equal to the difference between the maximum output voltage value of the analog-to-digital converter and the second threshold voltage value.

18. A display substrate comprising: a display area and a non-display area, wherein the non-display area is provided with the light detection structure according to claim 1.

* * * * *